(12) United States Patent
Kizaki et al.

(10) Patent No.: US 12,448,050 B2
(45) Date of Patent: Oct. 21, 2025

(54) LOWER VEHICLE-BODY STRUCTURE OF VEHICLE

(71) Applicant: MAZDA MOTOR CORPORATION, Hiroshima (JP)

(72) Inventors: Isamu Kizaki, Hiroshima (JP); Takuto Fukushima, Hiroshima (JP); Masanori Honda, Hiroshima (JP); Chikara Kawamura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 416 days.

(21) Appl. No.: 18/155,561

(22) Filed: Jan. 17, 2023

(65) Prior Publication Data

US 2023/0311998 A1    Oct. 5, 2023

(30) Foreign Application Priority Data

Apr. 5, 2022    (JP) ................ 2022-062969

(51) Int. Cl.
| | |
|---|---|
| B62D 25/02 | (2006.01) |
| B62D 21/03 | (2006.01) |
| B62D 21/15 | (2006.01) |
| B62D 25/20 | (2006.01) |
| B62D 27/02 | (2006.01) |

(52) U.S. Cl.
CPC ........... B62D 25/025 (2013.01); B62D 21/03 (2013.01); B62D 21/157 (2013.01); B62D 25/2036 (2013.01); B62D 27/023 (2013.01)

(58) Field of Classification Search
CPC ............. B62D 25/025; B62D 25/2036; B62D 21/157; B62D 27/023

USPC ................ 296/209, 29, 30, 187.12
See application file for complete search history.

(56) References Cited

U.S. PATENT DOCUMENTS

| | | | |
|---|---|---|---|
| 7,222,911 B2 * | 5/2007 | Abe ................ | B62D 25/2018 296/203.02 |
| 8,292,356 B2 * | 10/2012 | Ishigame ............ | B60N 2/005 296/193.07 |
| 2016/0194032 A1 | 7/2016 | Yamamoto et al. | |

FOREIGN PATENT DOCUMENTS

JP          2015-058749 A       3/2015

* cited by examiner

Primary Examiner — Dennis H Pedder
(74) Attorney, Agent, or Firm — Studebaker Brackett PLLC

(57) ABSTRACT

A side sill constituting a vehicle body comprises a side sill outer and a side sill inner. Each of an upper-side side face portion (upper face portion) and a lower-side side face portion (lower face portion) of the side sill inner comprises a second bending portion (bending portion) being formed by each of the upper face portion and the lower face portion bent toward an inside of the side sill, an upper-side slant face portion and a lower-side slant portion which respectively extend toward the side sill outer in an oblique direction such that a width, in a vertical direction, of the side sill inner gradually increases, and a second upper face portion and a second lower face portion (vehicle-width-direction face portions) which respectively extend in a vehicle width direction toward an inward side, in the vehicle width direction, from the second bending portion.

15 Claims, 16 Drawing Sheets

LOWER VEHICLE-BODY STRUCTURE OF VEHICLE

BACKGROUND OF THE INVENTION

The present invention relates to a lower vehicle-body structure of a vehicle.

When the vehicle has a small overlap collision (i.e., a collision load partially acts on an area of ¼ or less, in a vehicle width direction, of a front face of the vehicle in a vehicle frontal collision), the collision load is applied to a front end portion of either one of a pair of side sills which constitute both-side frames of a lower part of a vehicle body rearwardly and inwardly via a front wheel positioned at a forward side of the side sill. Consequently, there is a concern that the front end portion of the side sill may be bent inwardly, so that a space of a cabin may be improperly narrowed. Conventionally, various vehicle-body structures haven been proposed to prevent this bending deformation in the small overlap collision.

In a vehicle-body structure disclosed in Japanese Patent Laid-Open Publication No. 2015-58749 (US 2016/0194032 A1), a side sill (rocker) having a closed-cross section structure extending in a vehicle longitudinal direction is provided, and plural reinforcing members are provided inside of a front end portion of a side sill outer which constitutes an outward-side portion of a side sill in order to reinforce the side sill. Each of the reinforcing members is joined to a front face portion (a face positioned on a vehicle's forward side), a side face portion (a face directed to a vehicle's inward side), a lower face portion, and others of an inner face of the side sill outer, so that it is attained that the front end portion of the side sill outer is reinforced from the inside, thereby preventing the bending deformation of the side sill in the small overlap collision of the vehicle.

However, while the above-described vehicle-body structure is provided with the reinforcing members at the front end portion of the side sill outer for countermeasures of the small overlap collision, there is a problem that in a case where the collision load increases in the small overlap collision because of a large vehicle size or the like, the weight and costs of the reinforcing members may improperly increase for preventing deformation against the large collision load.

SUMMARY OF THE INVENTION

The present invention has been devised in view of the above-described matters, and an object of the present invention is to provide a lower vehicle-body structure of a vehicle which can properly suppress the deformation of the side sill, without increasing the weight and manufacturing costs, in the small overlap collision of the vehicle.

The lower vehicle-body structure of the vehicle according to the present invention comprises a side sill having a closed-cross section jointly formed by a side sill outer and a side sill inner which extend in a vehicle longitudinal direction, and a cross member joined to the side sill inner of the side sill at a position located on a rearward side, in the vehicle longitudinal direction, relative to a front end portion of the side sill and extending toward an inward side, in a vehicle width direction, from the side sill, wherein the side sill inner comprises an upper face portion and a lower face portion which is downwardly away from the upper face portion, each of which comprises a bending portion, a slant face portion, and a vehicle-width-direction face portion which are respectively located at least in an area, in the vehicle longitudinal direction, between the front end portion of the side sill and the cross member, the bending portion being formed by each of the upper face portion and the lower face portion bent toward an inside of the side sill, the slant face portion being configured to extend from the bending portion toward the side sill outer in an oblique direction such that a width, in a vertical direction, of the side sill inner gradually increases, the vehicle-width-direction face portion being configured to extend in the vehicle width direction toward the inward side, in the vehicle width direction, from the bending portion.

According to the present invention, while a bending load is applied to the side sill with a support point of a joint portion of the cross member and the side sill inner when the collision load is applied to the front end portion of the side sill rearwardly and inwardly in the small overlap collision, in a process of the respective bending portions of the upper face portion and the lower face portion being deformed toward an inside of the side sill, the respective slant face portions change their inclinations (angles) such that a width, in a vertical direction, of the side sill inner increases, whereas the respective vehicle-width-direction face portions can keep their mostly parallel states to an application direction of the collision load. Thereby, a large reaction force can be generated by the side sill inner itself, so that the bending deformation of the side sill can be suppressed. Accordingly, since it is unnecessary in the above-described structure that the reinforcing members are provided inside the side sill like the conventional structure, the deformation of the side sill can be properly suppressed, without increasing the weight and manufacturing costs, in the small overlap collision of the vehicle.

In the above-described lower vehicle-body structure of the vehicle, it is preferable that an upper face of the cross member be located at the same level as the vehicle-width-direction face portion of the upper face portion of the side sill inner.

According to this structure, the cross member can properly support the side sill which receives the bending load in the small overlap collision, suppressing torsion of the side sill.

In the above-described lower vehicle-body structure of the vehicle, it is preferable that the cross member comprise a first flange portion which is joined to the vehicle-width-direction face portion of at least one of the upper face portion and the lower face portion of the side sill inner.

According to this structure, since the vehicle-width-direction face portion of at least one of the upper face portion and the lower face portion of the side sill inner is joined to the first flange portion, in the deformation process of the side sill in the small overlap collision, deformation of the vehicle-width-direction face portion of the side sill inner is so suppressed that the vehicle-width-direction face portion can securely keep its mostly parallel state to the application direction of the collision load.

In the above-described lower vehicle-body structure of the vehicle, it is preferable that the side sill inner comprise a vertical wall portion which extends in the vertical direction at an end portion of an inward side, in the vehicle width direction, of the side sill inner and interconnects the upper face portion and the lower face portion, and the cross member comprise a second flange portion which is joined to the vertical wall portion of the side sill inner.

According to this structure, since the vertical wall portion of the side sill inner is joined to the second flange portion of the cross member, the side sill receiving the bending load in the small overlap collision can be securely supported by the cross member.

In the above-described lower vehicle-body structure of the vehicle, it is preferable that the side sill inner comprise a vertical wall portion which extends in a vertical direction at an end portion of the inward side, in the vehicle width direction, of the side sill inner and interconnects the upper face portion and the lower face portion, and the vertical wall portion have a bead which extends in the vehicle longitudinal direction.

According to this structure, the rigidity of a whole part of the side sill including the side sill inner against the bending deformation can be improved.

In the above-described lower vehicle-body structure of the vehicle, it is preferable that the bead extend from the front end portion of the side sill at least up to a rear end portion of the cross member.

According to this structure, since the rigidity of a part of the side sill which is positioned from the front end portion of the side sill to a rear end portion of the cross member is improved by the bead, the bending deformation of the side sill can be effectively prevented when the collision load is applied to the front end portion of the side sill in the small overlap collision.

In the above-described lower vehicle-body structure of the vehicle, it is preferable that the side sill inner further comprise a pair of upper-and-lower flange portions which are provided at respective end portions, on a side of the side sill outer, of the upper face portion and the lower face portion, and the side sill further comprise a connecting plate portion which interconnects the pair of upper-and-lower flange portions of the side sill inner.

According to this structure, while a force to make the upper face portion and the lower face portion of the side sill inner move in a direction where these portions go away from each other in a vertical direction is generated when the collision load is applied to the front end portion of the side sill in the small overlap collision, since the respective upper-and-lower flange portions of the upper face portion and the lower face portion are connected by the connecting plate portion, a sectional collapse of the upper face portion and the lower face portion of the side sill inner can be suppressed by a tension of the connecting plate portion.

In the above-described lower vehicle-body structure of the vehicle, it is preferable that the connecting plate portion be arranged at a part of the side sill, in the vehicle longitudinal direction, which forms a door opening portion of a vehicle body.

While the door opening portion of the vehicle body is an area with no pillar extending in the vertical direction where the support rigidity of the side sill is low, since the connecting plate portion is arranged at the part of the side sill which forms the door opening portion of the vehicle body as described above, the sectional collapse of the upper face portion and the lower face portion of the side sill inner can be securely suppressed even in the area with no pillar.

In the above-described lower vehicle-body structure of the vehicle, it is preferable that the connecting plate portion be configured to have smaller bending strength than the side sill outer and the side sill inner.

According to this structure, the suppression of the sectional deformation of the side sill inner can be attained along with suppression of the weight and costs of the connecting plate portion.

As described above, the lower vehicle-body structure of the vehicle according to the present invention can properly suppress the deformation of the side sill, without increasing the weight and manufacturing costs, in the small overlap collision of the vehicle.

The present invention will become apparent from the following description which refers to the accompanying drawings.

DETAILED DESCRIPTION OF THE INVENTION

Figure 1:
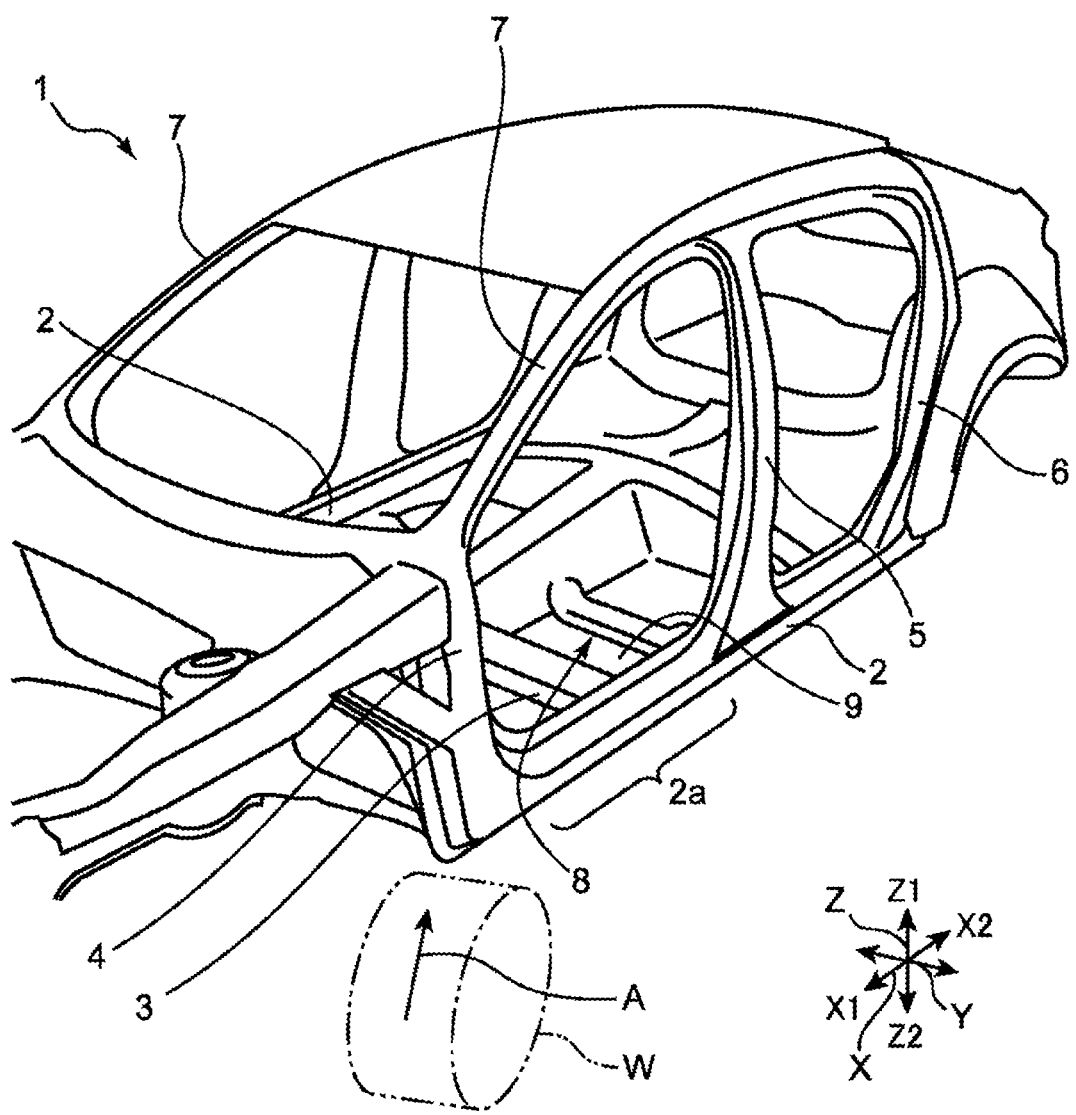
FIG. 1 is a perspective view showing a whole structure of a vehicle body provided with a lower vehicle-body structure of a vehicle according to an embodiment of the present invention.

Hereafter, a lower vehicle-body structure of a vehicle according to an embodiment of the present invention will be described specifically referring to the drawings.

As shown in FIGS. 1-4, a vehicle body 1 to which the lower vehicle-body structure of the vehicle according to the embodiment of the present invention is applied comprises, as frame members forming frames of the vehicle body 1, a pair of side sills 2 which extend in a vehicle longitudinal direction X at both sides, in a vehicle width direction Y, of the vehicle body 1 and a cross member 3 which extends in the vehicle width direction Y and interconnects the pair of side sills 2. Further, as other frame members, a hinge pillar 4, a center pillar 5, and a rear pillar 6 are provided to stand in order, in the vehicle longitudinal direction X, at intervals at each of both sides, in the vehicle width direction Y, of the vehicle body 1. The side sill 2 of the present embodiment extends in the vehicle longitudinal direction X between the hinge pillar 4 and the rear pillar 6. Further, a front pillar 7 which extends upwardly Z1 and rearwardly X2 toward an upper end of the center pillar 5 from an upper end of the hinge pillar 4 is provided. A door opening portion 8 at a vehicle front side is formed by these side sill 2, hinge pillar 4, center pillar 5, and front pillar 7. A door, not illustrated, is attached to the door opening portion 8 (specifically, a portion forming the door opening portion 8 at the hinge pillar 4) so as to open or close the door opening portion 8. Further, a floor panel 9 which forms a vehicle-body floor portion is provided between the pair of side sills 2 of the vehicle body 1.

Figure 4:
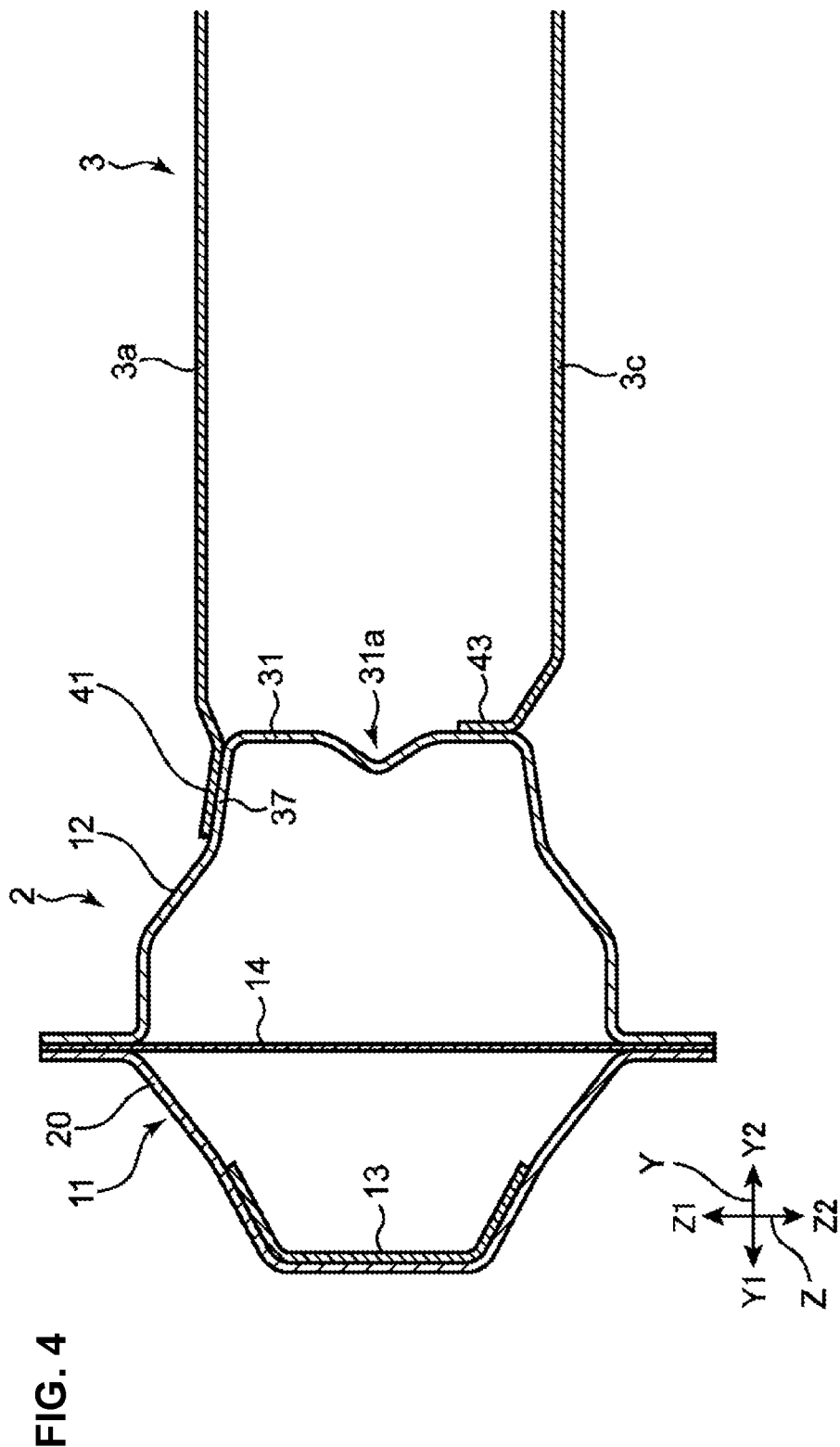
FIG. 4 is a sectional view taken along line IV-IV in FIG. 2.
Figure 5:
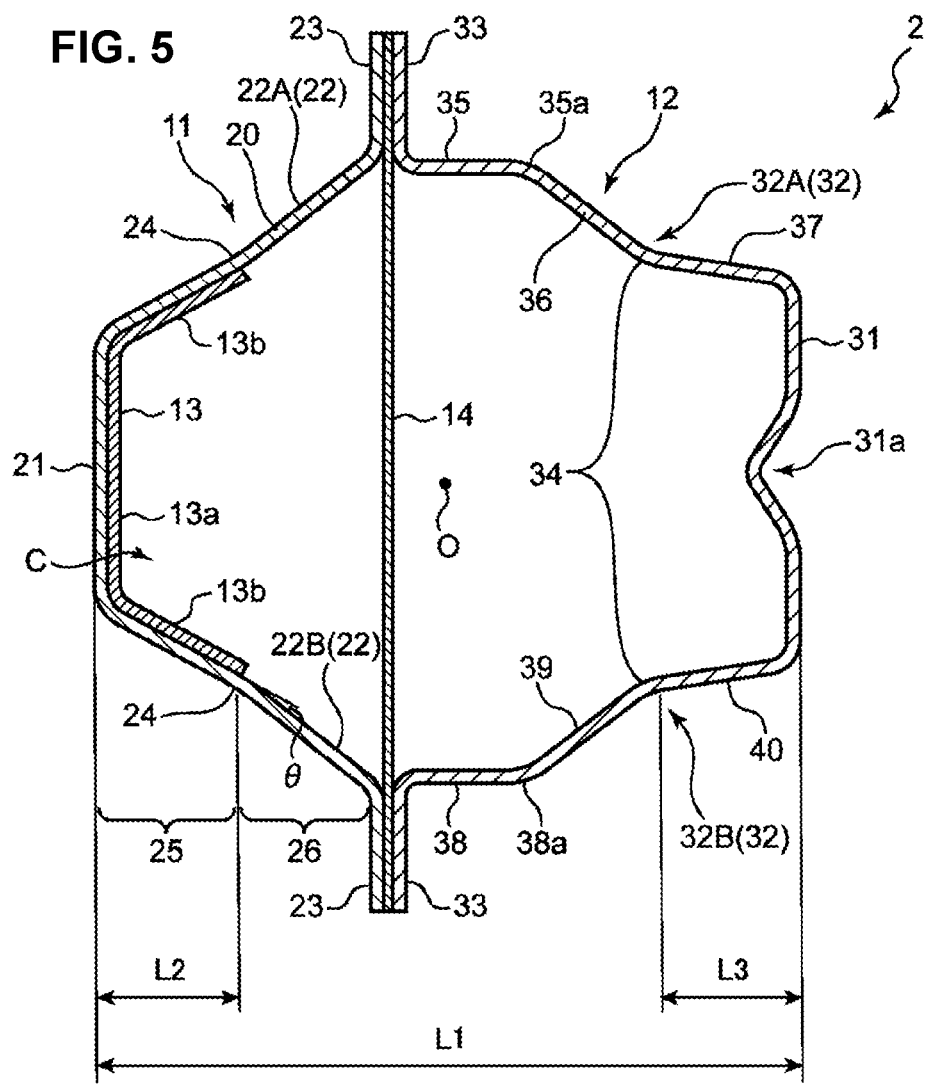
FIG. 5 is a sectional view of the side sill in FIG. 4.

As shown in FIGS. 4 and 5, the side sill 2 is a roughly cylindrical member which extends in the vehicle longitudinal direction X at the both-side portions of the vehicle body 1 and has a closed-cross section C, which comprises a pair of flange portions 23 and a pair of flange portions 33 which protrude upwardly Z1 and downwardly Z2, respectively.

The side sill 2 as the frame member of the vehicle body 1 comprises a side sill outer 11, a side sill inner 12 which is positioned on an inward side Y2, in the vehicle width direction Y, relative to the side sill outer 11, and a connecting plate portion 14 which is interposed between the side sill outer 11 and the side sill inner 12.

The side sill outer 11 is formed by two sheets of plate members, such as steel plates (a main plate member 20 and a patch 13), and the side sill inner 12 and the connecting plate portion 14 are respectively formed by a sheet of plate member, such as the steel plate.

The side sill outer 11 comprises a pair of upper-and-lower flange portions 23 and constitutes a part of an outward side Y1, in the vehicle width direction, of the side sill 2. The side sill inner 12 comprises a pair of upper-and-lower flange portions 33 and constitutes a part of an inward side Y2, in the vehicle width direction, of the side sill 2.

The flange portions 23 of the side sill outer 11 and the flange portions 33 of the side sill inner 12 are joined together, thereby forming the side sill 2. That is, the closed-cross section C of the side sill 2 is formed together (specifically, joined) by the side sill outer 11 and the side sill inner 12 which extend in the same direction (the vehicle longitudinal direction X in the present embodiment).

Hereafter, the structure of the side sill outer 11 will be described more specifically. As shown in FIGS. 4 and 5, the side sill outer 11 of the present embodiment is formed by the two sheets of plate members, e.g., steel plates, of the main plate member 20 and the patch 13, which are joined together and then pressed in a shape having a hat-shaped cross section (i.e., a shape having the pair of flange portions 23).

The side sill outer 11 specifically comprises a vertical wall portion 21 which extends in a vertical direction Z, an upper-side side face portion 22A and a lower-side side face portion 22B as a pair of side face portions 22 which extend toward the side sill inner 12, i.e., toward the inward side Y2, from both end portions of the vertical wall portion 21, expanding in the vertical direction Z, and the pair of flange portions 23 which extend toward an upward side Z1 and a downward side Z2, respectively, from respective ends of the inward sides Y2 of the pair of side face portions 22. The lower-side side face portion 22B is downwardly away from the upper-side side face portion 22A.

Each of the pair of side face portions 22 (i.e., the upper-side side face portion 22A and the lower-side side face portion 22B) comprises a first bending portion 24 which is formed by the side face portion 22 which is bent toward an inside of the side sill 2, a first portion 25 which is positioned on a side of the vertical wall portion 21 relative to the first bending portion 24, and a second portion 26 which is positioned on a side away from the vertical wall portion 21 relative to the first bending portion 24.

The first bending portion 24 is formed by the side face portion 22 being bent toward the inside of the side sill 2 (specifically, a portion of the main plate member 20 which corresponds to the side face portion 22).

When a bending load B2 (see FIG. 12) operative to bend the side sill 2 toward a vehicle inside is applied to the side sill 2 in a vehicle side collision (when an obstacle or the like hits against a vehicle side from an outward side) or the like, a compressive stress is generated at the vertical wall portion 21. Further, at the pair of side face portions 22, the compressive stress is generated at the first portion 25 and also a tensional stress is generated at the second portion 26.

Accordingly, the side sill outer 11 of the present embodiment is configured such that the first portion 25 (first portion) has the larger rigidity than the second portion 26 (second portion) against the bending load B2 to compress the vertical wall portion 21. In the present embodiment, the first portion 25 is formed by the two sheets of the plate members (the main plate member 20 and the patch 13) joined together. The patch 13 shown in FIG. 5 is joined to an inside of the main plate member 20. The patch 13 comprises a body portion 13a and a pair of both-side portions 13b which are formed by both-side portions of the body portion 13a which are bent. The body portion 13a is joined to the vertical wall portion 21, and the both-side portions 13b are joined to the first portion 25. A position of a tip of each of the both-side portions 13b matches a position of the first bending portion 24. Thereby, the vertical wall portion 21 of the side sill outer 11 and the first portion 25 of each of the side face portions 22 have high rigidity, whereas the second portion 26 where the patch 13 does not exist has low rigidity.

Further, the first portion 25 of the side face portion 22 of the present embodiment is formed by the main plate member 20 and the patch 13 which are joined together, whereas the second portion 26 is formed by the main plate member 20 only. Thereby, the rigidity of the side face portion 22 is configured to change discontinuously at the first bending portion 24 as a border. In other words, while the first portion 25 and the second portion 26 of the present embodiment have the constant rigidity in their respective areas, the side face portion 22 is configured such that the rigidity of the first portion 25 and the rigidity of the second portion 26 substantially change from each other at the first bending portion 25.

While the patch 13 can be joined to either face of the outward side Y1 and the inward side Y2 of the main plate member 20, the outward side Y1 face is preferable because the first portion 25 may not be easily crushed (deformed) in the vehicle collision.

Since the rigidity of the side face portion 22 of the present embodiment is configured to change discontinuously at the first bending portion 24 as the border as described above, the side sill 2 easily has the buckling at the first bending portion 24 when the bending load B2 (see FIG. 12) is applied to the side sill 2 in the vehicle side collision. Accordingly, even if an angle θ of the first bending portion 24 between an extension line of the first portion 25 and the second portion 26 is set at 30 degrees or less as shown in FIG. 5, the buckling of the side sill 2 can be attained securely.

Next, the structure of the side sill inner 12 will be described specifically. As shown in FIGS. 4 and 5, the side sill inner 12 is formed by a single sheet of plate member, e.g., steel plate, which is pressed in a shape having a hat-shaped cross section (i.e., a shape having the pair of flange portions 33).

The side sill inner 12 specifically comprises a vertical wall portion 31 which extends in the vertical direction Z at an end portion of the inward side Y2, a pair of side face portions 32 (i.e., an upper-side side face portion 32A (upper face portion) and a lower-side side face portion 32B (lower face portion) which extend toward the side sill outer 11, i.e., toward the outward side Y1, from both end portions of the vertical wall portion 31, expanding in the vertical direction Z, and the pair of flange portions 33 which extend toward the upward side Z1 and the downward side Z2, respectively, from respective ends of the outward sides Y1 (i.e., on the side of the side sill outer 11) of the upper-side side face portion 32A and the lower-side side face portions 32B. The lower-side side face portion 32B (lower face portion) is arranged downwardly Z2 away from the upper-side side face portion 32A (upper face portion). Herein, when the bending load B2 (see FIG. 1) is applied to the side sill 2, a tensional stress is generated at the vertical wall portion 31.

Figure 3:
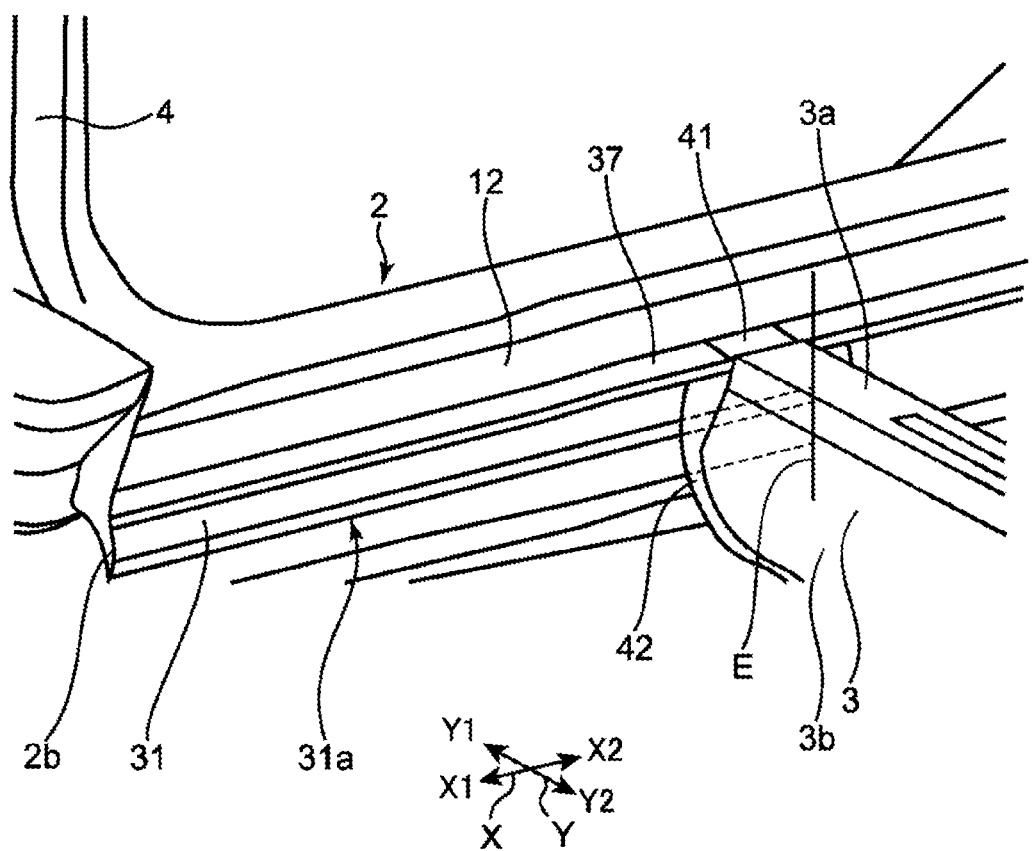
FIG. 3 is an enlarged perspective view showing the arrangement of the side sill, the cross member, and the hinge pillar in FIG. 1.

As shown in FIGS. 3 and 5, a bead 31a to reinforce the side sill inner 12 is provided to extend in an extension direction of the side sill inner 12 (i.e., in the vehicle longitudinal direction X) is formed at a middle portion, in the vertical direction Z, of the vertical wall portion 31. The bead 31a is formed by recessing a part of the middle portion of the vertical wall portion 31 inwardly (toward the outward side Y1). As shown in FIG. 3, the bead 31a of the present embodiment extends from an end portion 2b of a forward side X1 of the side sill 2 (a connection portion of the hinge pillar 4) up to a position E of an end portion of a rearward side X2.

The upper-side side face portion 32A (upper face portion) and the lower-side side face portion 32B (lower face portion) comprises respective second bending portions 34 (bending portions) which are bent toward the inside of the side sill 2 and respective two faces which extend in the vehicle width direction Y (see faces 35, 37, 38, 40 shown in FIG. 5). That is, each of the upper-side side face portion 32A and the lower-side side face portion 32B has a roughly step-shaped cross section having two steps.

Specifically, the upper-side side face portion 32A of the pair of side face portions 32 comprises a first upper face portion 35 which extends in the vehicle width direction Y, an upper-side slant face portion 36 (slant face portion) which extends obliquely toward the inward side Y2 and the downward side Z2 from an end portion 35a of the inward side Y2 of the first upper face portion 35, and a second upper face portion 37 (vehicle-width-direction face portion) which extends toward the inward side Y2 from an end portion of the inward side Y2 of the upper-side slant portion 36, forming the second bending portion 34 (bending portion).

Further, the lower-side side face portion 32B comprises a first lower face portion 38 which extends in the vehicle width direction Y at a position downwardly away from the first upper face portion 35, a lower-side slant face portion 39 (slant face portion) which extends obliquely toward the inward side Y2 and the upward side Z1 from an end portion 38a of the inward side Y2 of the first lower face portion 38, and a second lower face portion 40 (vehicle-width-direction face portion) which extends toward the inward side Y2 from an end portion of the inward side Y2 of the lower-side slant portion 39, forming the second bending portion 34 (bending portion). The lower-side side face portion 32B is linearly symmetrical to the upper-side side face portion 32A. Accordingly, in the vehicle width direction Y, the first lower face portion 38 has the same width as the first upper face portion 35, the lower-side slant face portion 39 has the same width and slant angle as the upper-side slant face portion 36, and the second lower face portion 40 has the same width as the second upper face portion 37.

That is, the side sill inner 12 is configured to have the pair of upper-and-lower bending portions 34 which are respectively bent toward the inside of the cross section of the side sill 2 at a point between the second upper face portion 37 and the upper-side slant portion 36 and another point between the second lower face portion 40 and the lower-side slant portion 39 as the bending portions which are formed by bending the upper-side side face portion 32A (upper face portion) and the lower-side side face portion 32B (lower face portion) toward the inside of the side sill 2.

Further, each of the upper-side side slant portion 36 and the lower-side slant portion 39 is configured to extend from the second bending portion 34 toward the side sill outer 11 in an oblique direction such that the width, in the vertical direction Z, of the side sill inner 12 gradually increases. Moreover, each of the second upper face portion 37 and the second lower face portion 40 as the vehicle-width-direction face portion extends in the vehicle width direction Y toward the inward side Y2, in the vehicle width direction, from the second bending portion 34.

In the present embodiment, the upper-side side face portion 32A (upper face portion) and the lower-side side face portion 32B (lower face portion) of the side sill inner 12 comprise the second bending portions 34 (bending portions), the upper-side side slant portion 36 and the lower-side slant portion 39 (slant face portions), and the second upper face portion 37 and the second lower face portion 40 (vehicle-width-direction face portions), which are respectively located at least in an area, in the vehicle longitudinal direction X, between the front end portion 2b of the side sill 2 and the cross member 3, in order to suppress the bending deformation of the side sill 2 in the small overlap collision. However, the above-described portions may be located over a whole length, in the vehicle longitudinal direction X, of the side sill 2.

The vertical wall portion 31 extends in the vertical direction Z and interconnects respective end portions of the inward side Y2 of the second upper face portion 37 and the second lower face portion 40, thereby attaining connection of the upper-side side face portion 32A (upper face portion) and the lower-side side face portion 32B (lower face portion).

As shown in FIGS. 3 and 4, an end portion of the cross member 3 extending in the vehicle width direction Y is joined to the side sill inner 12. In the present embodiment, the cross member 3 is joined to the side sill inner 12 at a position located on the rearward side X2, in the vehicle longitudinal direction X, relative to the front end portion 2b of the side sill 2 and extends toward an inward side Y2, in the vehicle width direction Y, from the side sill 2.

The cross member 3 has three flange portions, a first flange portion 41, a second flange portion 42, and a third flange portion 43 at its end portion. The first flange portion 41 extends toward the outward side Y1 from an upper face 3a of the cross member 3 and is joined to a second upper face portion 37 of the side sill inner 12. The second flange portion 42 extends in the vehicle longitudinal direction X from an end edge of the outward side Y1 of a side face 3b (a face directed toward the vehicle longitudinal direction X) of the cross member 3 toward the outward side Y1 from an upper face of the cross member 3 and is joined to the vertical wall portion 31 of the side sill inner 12. The third flange portion 43 extends toward the upward side Z1 (i.e., toward an inside of the cross member 3) from an end edge of the outward side Y1 of a bottom wall portion of the cross member 3 and is joined to the vertical wall portion 31.

It is preferable that the upper face 3a of the cross member 3 be located at the same level as the second upper face portion 37 (vehicle-width-direction face portion) of the side sill inner 12 in order to suppress torsion of the side sill 2 in the small overlap collision.

While the above-described first flange portion 41 extends toward the outward side Y1, in the vehicle width direction Y, from the upper face 3a of the cross member 3 and is joined to the second upper face portion 37 of the side sill inner 12, there may be provided an additional first flange portion 41 which extends toward the outward side Y1 from a lower face of the cross member 3 and is joined to the second lower face 40.

As shown in FIG. 5, the side sill 2 of the present embodiment is configured such that a width L2, in a specified direction where the side sill outer 11 and the side sill inner 12 are arranged in a row (vehicle width direction Y), of the first portion 25 positioned on the outward side Y1 is set at ¼ or less relative to a whole width L1, in the specified direction (vehicle width direction Y), of the side sill 2. Thereby, when the bending load B2 (see FIG. 12) is applied in the vehicle side collision or the like, the side sill 2 can have the buckling securely at the first bending portions 24.

Further, as shown in FIG. 5, since a width L3, in the specified direction where the side sill outer 11 and the side sill inner 12 are arranged in a row (vehicle width direction Y), of the second upper face portion 37 and the second lower face portion 40 is set at ¼ or less relative to the whole width L1, in the specified direction (vehicle width direction Y), of the side sill 2 can have the buckling securely at the second bending portions 34, suppressing buckling at the second upper face portion 37 and the second lower face 40, when the bending load B2 is applied in the vehicle side collision or the like.

Further, as show in FIG. 5, while the respective flange portions 23, 33 (particularly, the flange portions 23, 33 which protrude upwardly Z1) of the side sill outer 11 and the side sill inner 12 become a standard position of the door opening portion 8 in FIG. 1, a sufficient cabin space can be secured because the above-described flange portions are arranged on the outward side Y1 of a sectional center O of the side sill 2.

As shown in FIGS. 4 and 5, the connecting plate portion 14 interconnects the pair of upper-and-lower flange portions 23, 33 of the side sill outer 11 and the side sill inner 12 in a state where the connecting plate portion 14 is interposed between the respective pair of upper-and-lower flange portions 23, 33 of the side sill outer 11 and the side sill inner 12.

While the connecting plate portion 14 can be located at any position in the vehicle longitudinal direction X as long as it is located inside the side sill 2, it is preferable that the connecting plate portion 14 be arranged as shown in FIG. 1 so as to promote the buckling at a portion 2a of the side sill 2 which forms the door opening portion 8 of the vehicle body 1 in the vehicle longitudinal direction X by reinforcing this portion 2a and the like.

The connecting plate portion 14 is configured to have smaller bending strength than the side sill outer 11 and the side sill inner 12. Specifically, the connecting plate portion 14 is made of a plate member having a smaller thickness than the main plate member 20 and the patch 13 which forms the side sill outer 11 and the side sill inner 12.

The first bending portions 24 of the pair of side face portions 22 are provided to be equidistance from the vertical wall portion 21. That is, the both first bending portions 24 of the side sill outer 11 are positioned vertically symmetrically.

Features of Present Embodiment (1)

In the lower vehicle-body structure of the vehicle of the present embodiment, as shown in FIG. 5, the upper-side face portion 32A (upper face portion) and the lower-side face portion 32B (lower face portion) of the side sill inner 12 comprise the second bending portions 34 being formed by the upper-side face portion 32A and the lower-side face portion 32B which are bent toward the inside of the side sill 2, the upper-side slant face portion 36 and the lower-side slant face portion 39 (slant face portions) being configured to extend from the second bending portions 34 toward the side sill outer 11 in the oblique direction such that the width, in the vertical direction Z, of the side sill inner 12 gradually increases, and the second upper face portion 37 and the second lower face portion 40 (vehicle-width-direction face portions) being configured to extend in the vehicle width direction Y toward the inward side Y2, in the vehicle width direction Y, from the second bending portions 34, which are respectively located at least in the area, in the vehicle longitudinal direction X, between the front end portion 2b of the side sill 2 and the cross member 3.

Figure 2:
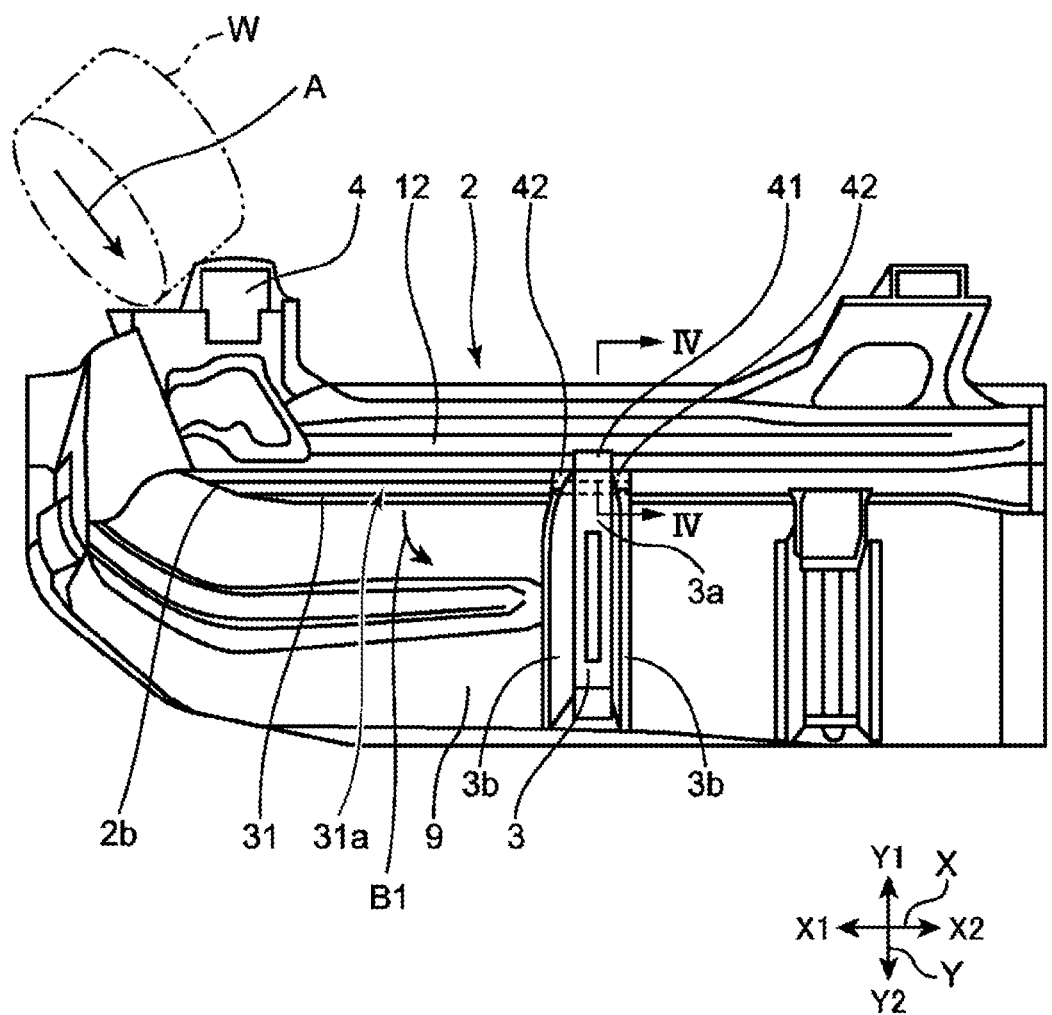
FIG. 2 is an enlarged plan view showing an arrangement of a side sill, a cross member, and a hinge pillar in FIG. 1.
Figure 6:
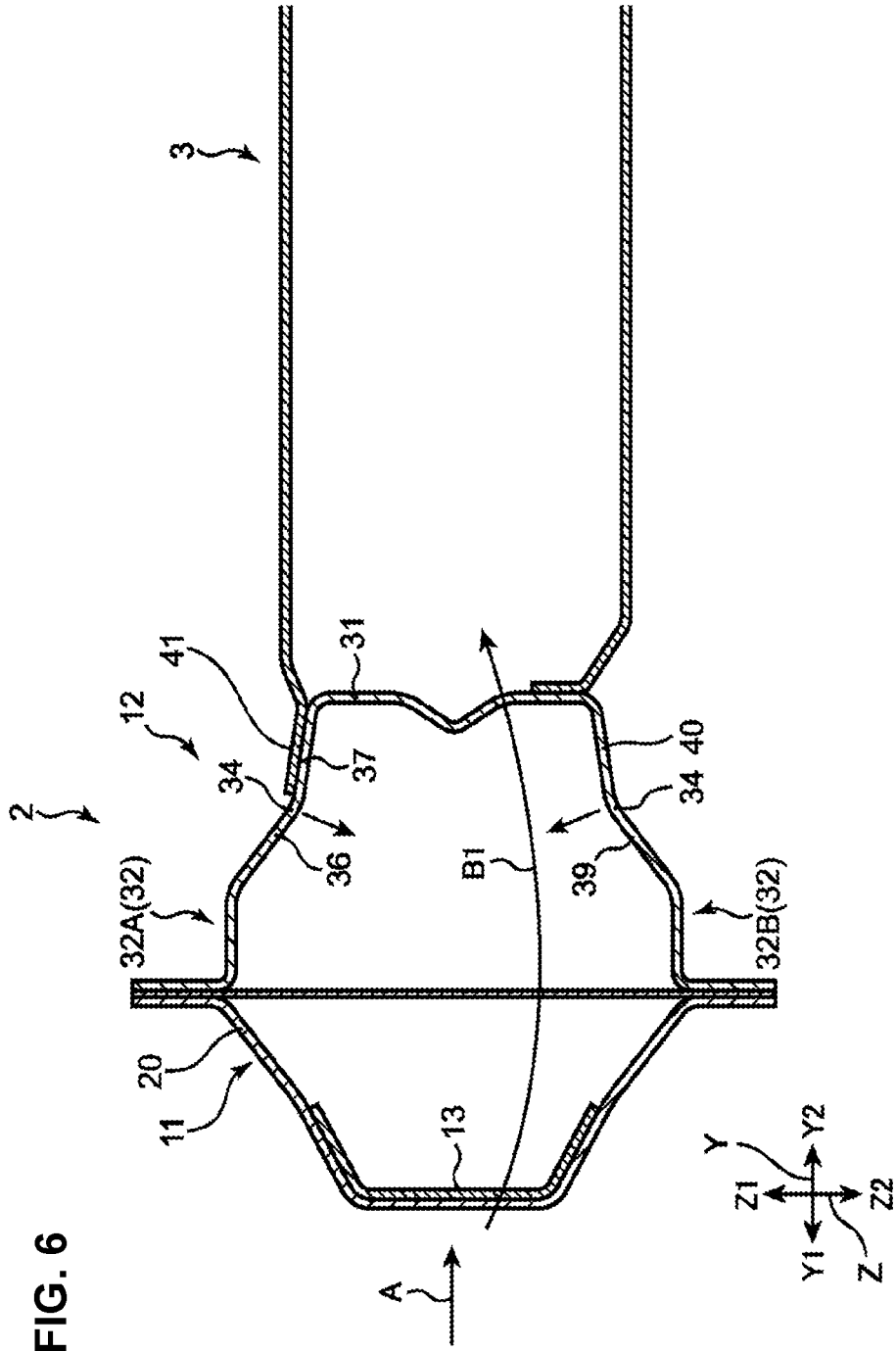
FIG. 6 is a sectional explanatory diagram of the side sill showing deformation of the side sill in a small overlap collision.

According to this structure, as shown in FIGS. 1, 2 and 6, a collision load A is applied to the front end portion 2b of the side sill 2 rearwardly X2 and inwardly Y2 via a front wheel W of the vehicle in the small overlap collision of the vehicle. Herein, a bending load B1 is applied to the side sill 2 with a support point of a joint portion of the cross member 3 and the side sill inner 12 (around an end portion of the cross member 3 where the first-third flange portions 41-43 are provided).

As shown in FIG. 6, in a process of the respective second bending portions 34 of the upper-side side face portion 32A and the lower-side side face portion 32B which are deformed toward the inside of the side sill 2 after the bending load B1 is applied, the upper-side slant face portion 36 and the lower-side slant face portion 39 which extend toward the side sill outer 11 from the second bending portions 34 change their inclinations (angles) such that the width, in the vertical direction Z, of the side sill inner 12 increases, whereas the second upper face portion 37 and the second lower face portion 40 which extend toward the inward side Y2, in the vehicle width direction Y, from the second bending portions 34 can keep their mostly parallel states to an application direction of the collision load A (specifically, the same direction as a load element, in the vehicle width direction Y, of the collision load A). Thereby, a large reaction force can be generated by the side sill inner 12 itself, so that the bending deformation of the side sill 2 can be suppressed. Accordingly, since it is unnecessary in the above-described structure that the reinforcing members are provided inside the side sill 2 like the conventional structure, the deformation of the side sill 2 can be properly suppressed, without increasing the weight and manufacturing costs, in the small overlap collision of the vehicle. Herein, while the connecting plate portion 14 is provided inside the side sill 2 in FIGS. 4 and 5, this connecting plate portion 14 is not indispensable for the present invention, and the structure without the connection plate portion 14 can provide the above-described effects as well, of course.

<Explanation about Effects Verification>

Figure 7:
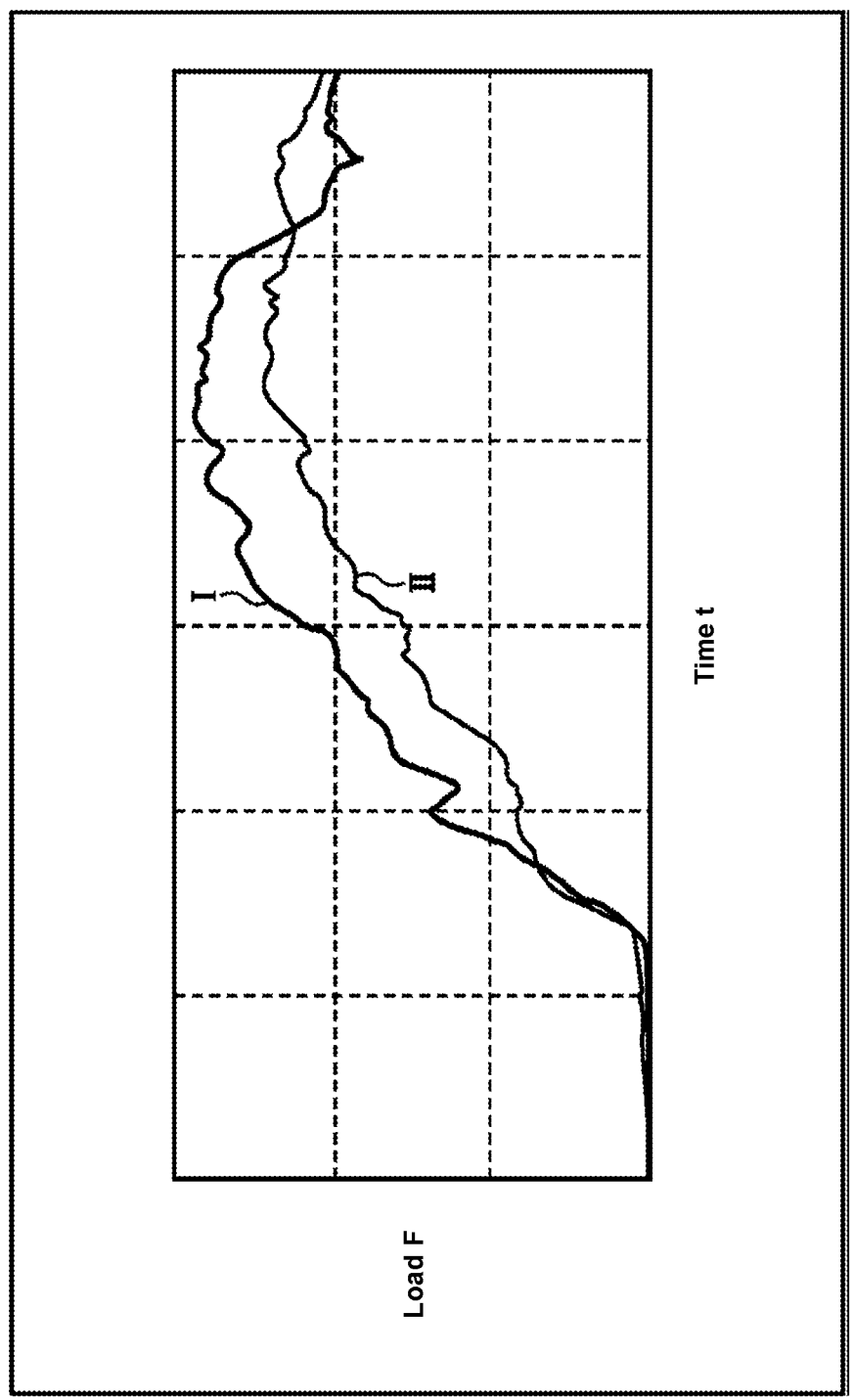
FIG. 7 is a graph showing time changes of respective bending loads of the side sill in the small overlap collision regarding the present embodiment and a comparative example.

Herein, in order to verify the above-described effects, verification results are shown by a curve I in FIG. 7. This verification was conducted by studying the reaction force of the side sill 2 against the bending load B1 in a case where the collision load A was applied to the front end portion 2b of the side sill 2 rearwardly X2 and inwardly Y2 via the front wheel W of the vehicle in the small overlap collision as shown in FIGS. 1, 2 and 6. A graph of FIG. 7 shows time changes of respective bending loads F which were generated at the side sill as the reaction force. Specifically, the curve I of FIG. 7 shows the time change of the bending load at the side sill 2 of the present embodiment, and a curve II of FIG. 7 shows the time change of the bending load at a conventional side sill 50 which is shown in FIG. 8.

Figure 8:
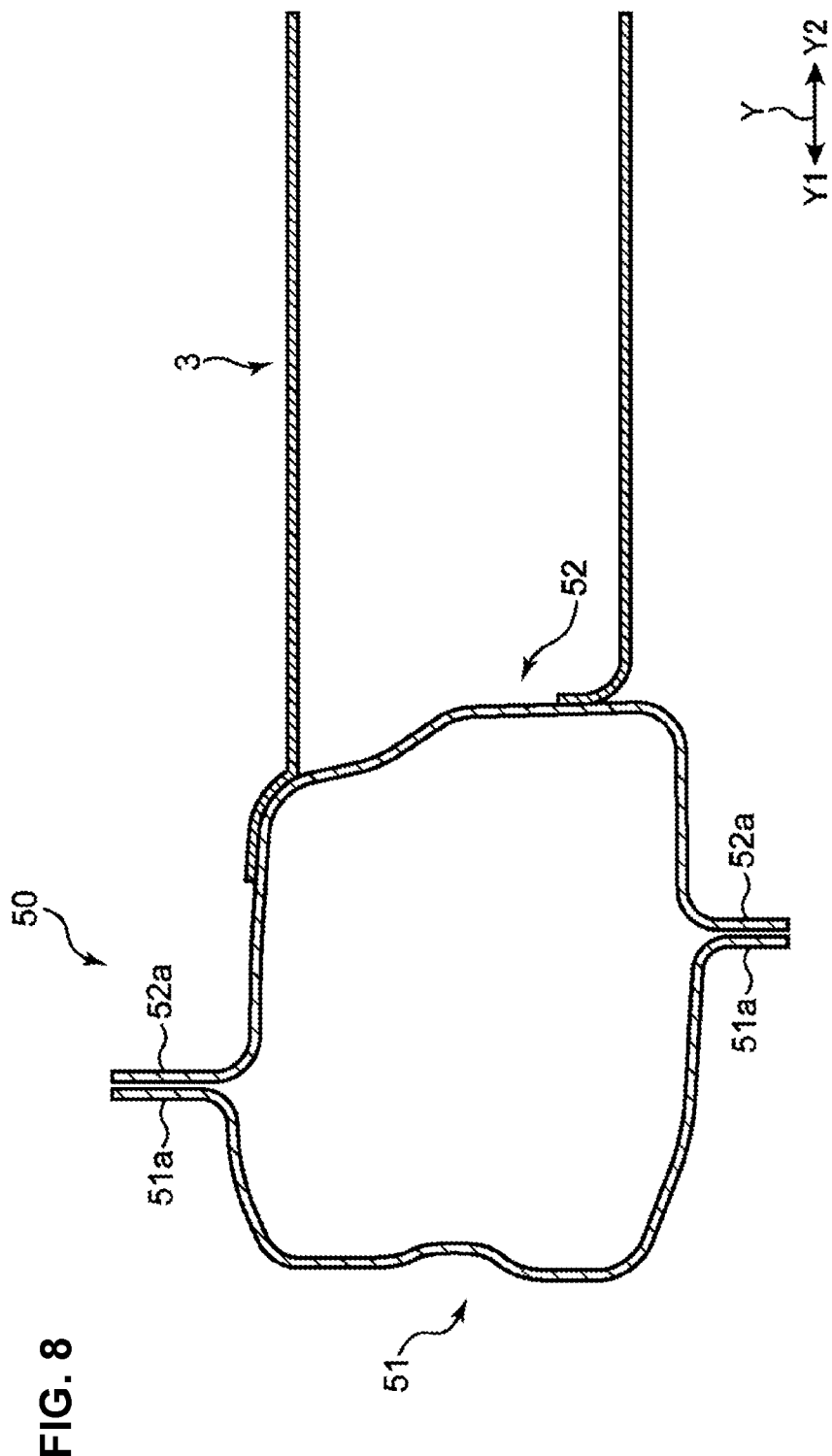
FIG. 8 is a sectional view of a general side sill and a cross member as the comparative example of the present invention.

Herein, the conventional side sill 50 shown in FIG. 8 is formed by a side sill outer 51 and a side sill inner 52 which have the same plate thickness, has a structure in which a pair of flange portions 51a of the side sill outer 51 and a pair of flange portions 52a of the side sill inner 52 are joined together, and is joined to an end portion of the cross member 3. This side sill 50 does not comprise the second bending portion 34, the slant face portion (the upper-side slant face 36 and the lower-side slant face portion 39), and the vehicle-width-direction face portion (the second upper face portion 37 and the second lower face portion 40) which are provided for increasing the reaction force generated at the side sill inner 52 like the present embodiment.

As apparent from the graph of FIG. 7, the side sill 2 of the present embodiment can maintain the large bending load as the reaction force against the bending load in the small overlap collision for a long period of time as shown by the curve I. Meanwhile, it is apparent as shown by the curve II that in a case of the side sill 50 of the comparative example shown in FIG. 8, the bending load which is generated as the reaction force in the small overlap collision is smaller than that of the curve I over a roughly whole period of time.

Figure 9:
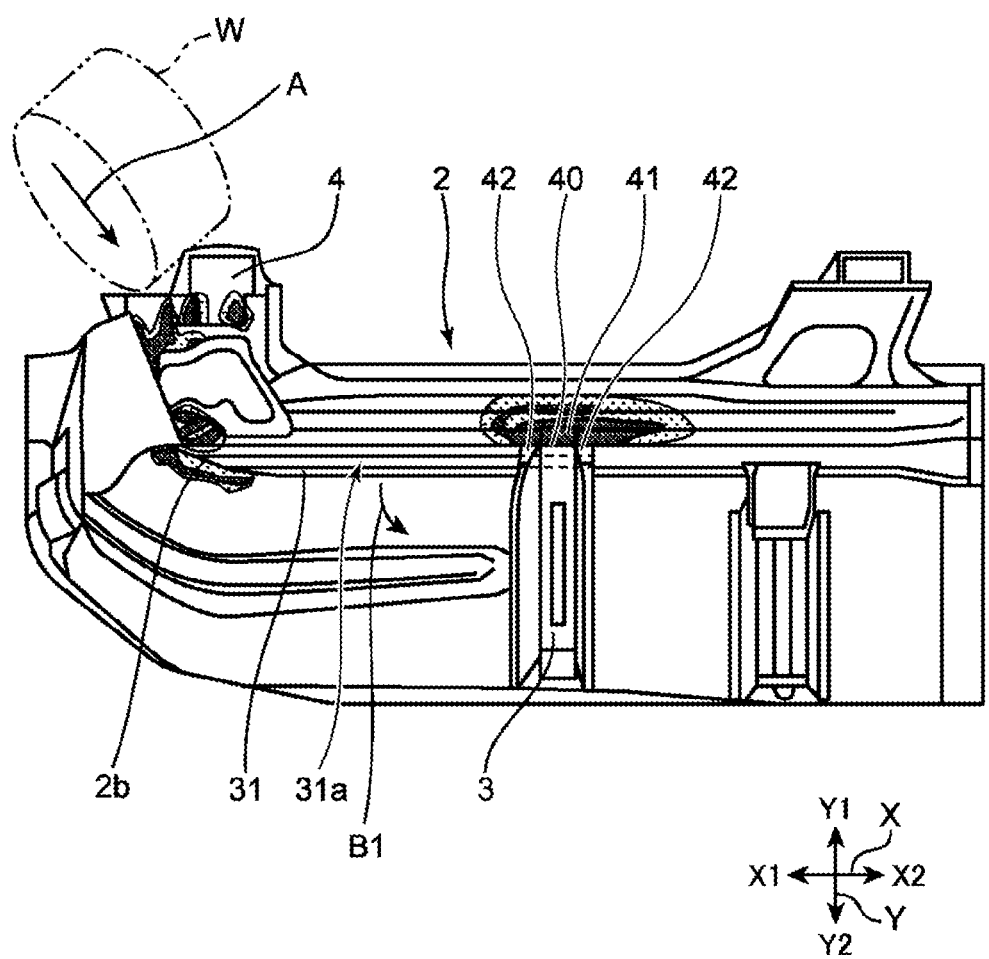
FIG. 9 is an explanatory diagram showing a stress distribution at the side sill of the present embodiment in the small overlap collision.
Figure 10:
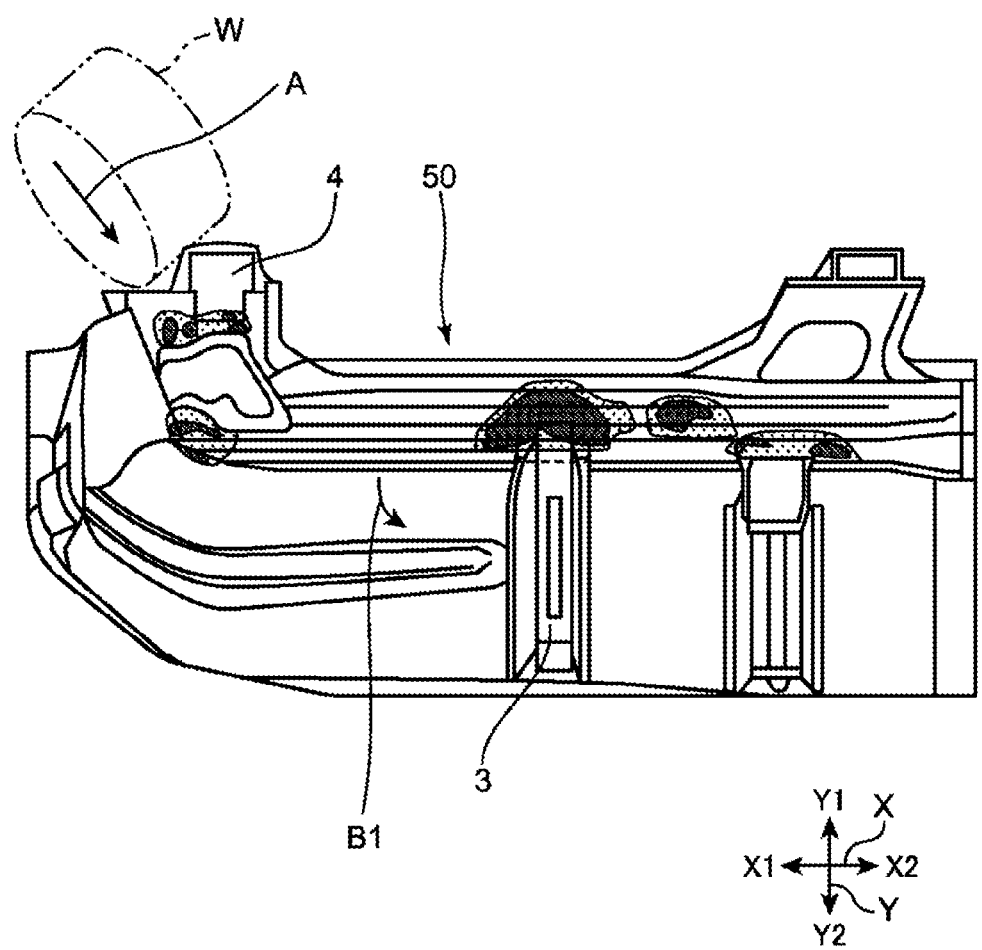
FIG. 10 is an explanatory diagram showing a stress distribution at the side sill of the comparative example in the small overlap collision.

Further, when the side sill 2 of the present embodiment and the side sill 50 of the comparative example shown in FIG. 8 are compared regarding a distribution of stress acting on the side sill in the small overlap collision, it is apparent that in the case of the side sill 2 of the present embodiment, an area with the large (high) stress (a dark portion in FIG. 9) extends over a wide range around the joint portion of the side sill 2 to the cross member 3, so that the large reaction force is generated at a whole part of the side sill 2. Meanwhile, it is apparent that in the case of the side sill 50 of the comparative example shown in FIG. 8, the area with the large (high) stress (a dark portion in FIG. 10) occurs intensively in a narrow small range around the joint portion of the side sill 50 to the cross member 3, so that the small reaction force is generated at the side sill 50 as a whole.

Moreover, in order to further verify the effects of the side sill according to the present invention, a modified example of the present invention was also tested. This modified example is configured such that the bead 31a (see FIGS. 2-5) formed at the side sill 2 extends not to the rear end position of the cross member 3 but just to the front end portion of the cross member 3. For this modified example, the reaction force of the side sill against the bending load B1 in the small overlap collision was studied in the same conditions described above. Results of this are shown by a curve I' of a graph shown in FIG. 11. It is apparent from the graph of FIG. 11 that the bending load, as the reaction force generated in the small overlap collision, of the modified example of the present invention (the bead 31a is short) (curve I') is larger than that of the side sill 50 of the above-described comparative example shown in FIG. 8 (curve II) over a long period of time.

Figure 11:
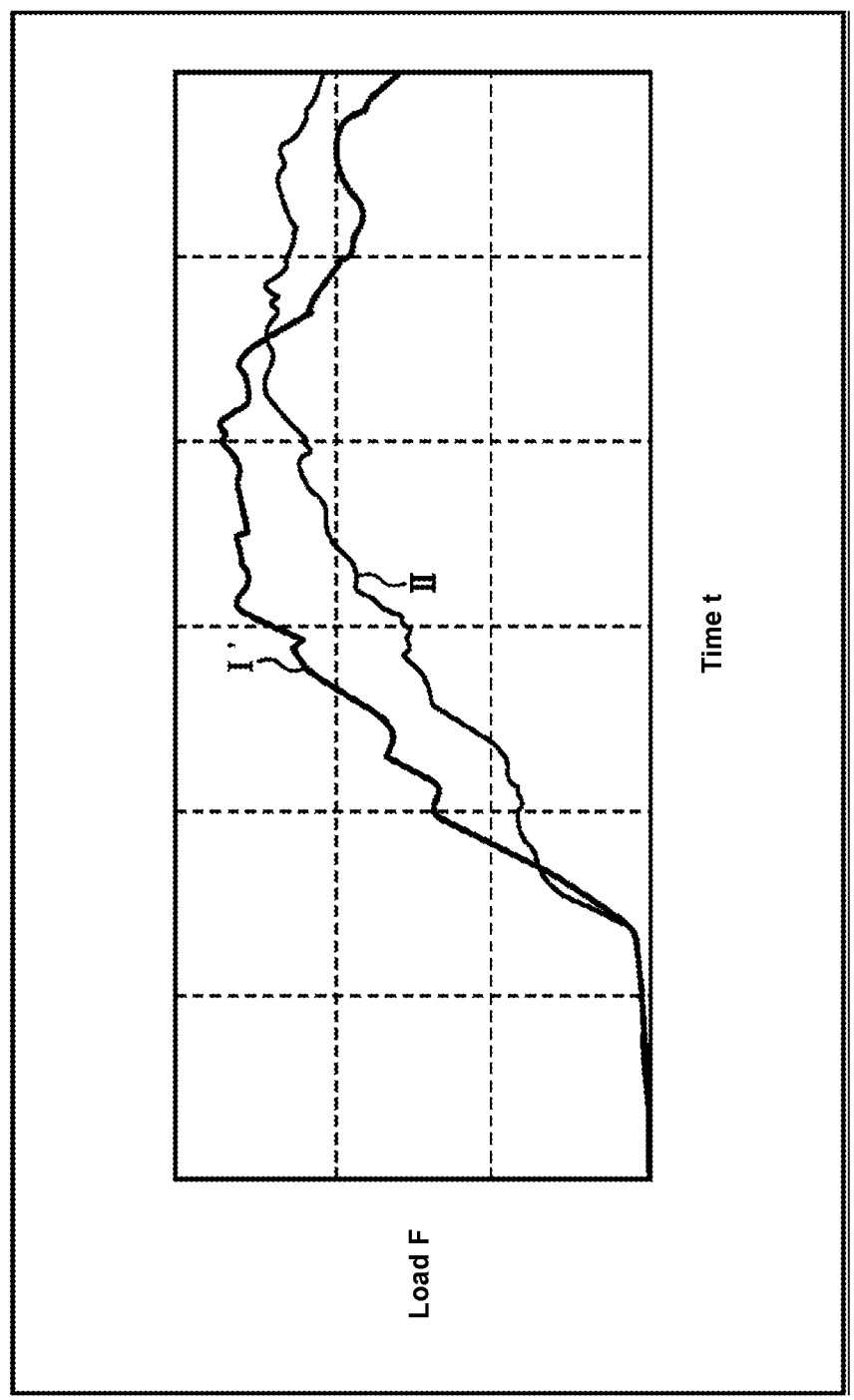
FIG. 11 is a graph showing time changes of respective bending loads of the side sill regarding a modified example of the present invention in which a bead ends at a front end portion of the cross member and the comparative example.

Accordingly, it can be found from the results shown by the graph of FIG. 11 that the structure, in which the second bending portions 34, the slant face portions (the upper-side slant face portion 36 and the lower-side slant face portion 39), and the vehicle-width-direction face portions (the second upper face portion 37 and the second lower face portion 40) are provided in order to increase the reaction force like the side sill 2 of the present embodiment, can keep the bending load as the reaction force at the large level even in a case where the bead 31a extends just to the front end portion of the cross member 3.

Herein, since the maximum magnitude of the bending load as the reaction force regarding the modified example of the present invention (the bead 31a is short) (the curve I' of FIG. 11) is slightly smaller than that regarding the side sill 2 of the present embodiment (the curve I of FIG. 7) and also the period of time when the bending load is large regarding the modified example of the present invention is slightly shorter than that regarding the side sill 2 of the present embodiment, the structure of the side sill 2 of the present embodiment in which the bead 31a extends up to the rear end portion of the cross member 3 is preferable because the large bending load as the reaction force can be obtained for a long period of time.

(2)

In the lower vehicle-body structure of the present embodiment, it is preferable that the upper face 3a of the cross member 3 shown in FIGS. 2-4 be located at the same level as the second upper face portion 37 of the upper-side side face portion 32A (upper face portion) of the side sill inner 12. In this case, the cross member 3 can properly support the side sill 2 which receives the bending load B1 in the small overlap collision, suppressing torsion of the side sill 2.

(3)

In the lower vehicle-body structure of the present embodiment, it is preferable that the cross member 3 comprise the first flange portion 41 which is joined to at least one of the second upper face portion 37 and the second lower face portion 40 (only the second upper face portion 37 in the embodiment shown in FIGS. 2-4) of at least one of the upper-side side face portion 32A and the lower-side side face portion 32B (only the upper-side side face portion 32A in the embodiment shown in FIGS. 2-4) of the side sill inner 12.

According to this structure, since at least one of the second upper face portion 37 and the second lower face portion 40 of at least one of the upper-side side face portion 32A and the lower-side side face portion 32B of the side sill inner 12 is joined to the first flange portion 41, in the deformation process of the side sill 2 in the small overlap collision, the deformation of at least one of the second upper face portion 37 and the second lower face portion 40 is so suppressed that the second upper face portion 37 and the second lower face portion 40 can securely keep their mostly parallel states to the application direction of the collision load A.

(4)

In the lower vehicle-body structure of the present embodiment, the side sill inner 12, as shown in FIGS. 2 and 3, comprises the vertical wall portion 31 which extends in the vertical direction Z at the end portion of the inward side Y2, in the vehicle width direction Y, of the side sill inner 12 and interconnects the upper-side side face portion 32A (upper face portion) and the lower-side side face portion 32B (lower face portion). The cross member 3 comprises the second flange portion 42 which is joined to the vertical wall portion 31 of the side sill inner 12. According to this structure, since the vertical wall portion 31 of the side sill inner 12 is joined to the second flange portion 42 of the cross member 3, the side sill 2 receiving the bending load B1 in the small overlap collision can be securely supported by the cross member 3.

Further, since the cross member 3 of the present embodiment further comprises the third flange portion 43 which is joined to the vertical wall portion 31 as shown in FIG. 4 in addition to the second flange portion 42, the side sill 2 can be supported by the cross member 3 more securely.

(5)

In the lower vehicle-body structure of the present embodiment, the vertical wall portion 31 of the side sill inner 12 has the bead 31a which extends in the vehicle longitudinal direction X as shown in FIGS. 2-5. According to this structure, the rigidity of a whole part of the side sill 2 including the side sill inner 12 against the bending deformation can be improved.

(6)

In the lower vehicle-body structure of the present embodiment, the bead 31a extends from the front end portion 2b of the side sill 2 at least up to the rear end portion (a position of a line E in FIG. 3) of the cross member 3. According to this structure, since the rigidity of the part of the side sill 2 which is positioned from the front end portion 2b of the side sill 2 to the rear end portion of the cross member 3 is improved by the bead 31a, the bending deformation of the side sill 2 can be effectively prevented when the collision load A is applied to the front end portion 2b of the side sill 2 in the small overlap collision.

(7)

In the lower vehicle-body structure of the present embodiment, the side sill inner 12, as shown in FIG. 5, further comprises the pair of upper-and-lower flange portions 33 which are provided at the respective end portions, on the side of the side sill outer 11, of the upper-side side face portion 32A and the lower-side side face portion 32B. The side sill 2 comprises the connecting plate portion 14 which interconnects the pair of upper-and-lower flange portions 33 of the side sill inner 12.

According to this structure, while the force to make the upper-side side face portion 32A and the lower-side side face portion 32B of the side sill inner 11 move in the direction where these portions go away from each other in the vertical direction is generated when the collision load A is applied to the front end portion 2b of the side sill 2 in the small overlap collision, since the respective upper-and-lower flange portions 33 of the upper-side side face portion 32A and the lower-side side face portion 32B are connected by the connecting plate portion 14, a sectional collapse of the upper-side side face portion 32A and the lower-side side face portion 32B of the side sill inner 11 can be suppressed by a tension of the connecting plate portion 14.

(8)

In the lower vehicle-body structure of the present embodiment, the connecting plate portion 14 is arranged at the part of the side sill 2, in the vehicle longitudinal direction X, which forms the door opening portion 8 (see FIG. 1) of the vehicle body 1.

While the door opening portion 8 of the vehicle body 1 is an area with no pillar extending in the vertical direction Z where the support rigidity of the side sill 2 is low, since the connecting plate portion 14 is arranged at the part 2a of the side sill 2 which forms the door opening portion 8 of the vehicle body 1 as described above, the sectional collapse of the upper-side side face portion 32A and the lower-side side face portion 32B of the side sill inner 12 can be securely suppressed even in the area with no pillar.

(9)

The bending strength of the connecting plate portion 14 is not required so much as the side sill outer 11 and the side sill inner 12 because the tensile load is applied to the connecting plate portion 14 only such that the pair of upper-and-lower flange portions 23, 33 are pulled in the vertical direction in the vehicle collision. Therefore, by configuring the connecting plate portion 14 to have smaller bending strength than the side sill outer 11 and the side sill inner 12, the suppression of the sectional deformation of the side sill inner 12 can be attained along with suppression of the weight and costs of the connecting plate portion 14. Moreover, the connecting plate portion 14 can be manufactured by using a thin and cheap material in addition to attaining the secure buckling of the side sill 2.

(Deformation Process of the Side Sill 2 in the Vehicle Side Collison)

Subsequently, the deformation process of the side sill 2 when the bending load B2 is applied to the side sill 2 in the vehicle side collision will be described referring to FIGS. 13A-13D.

Figure 12:
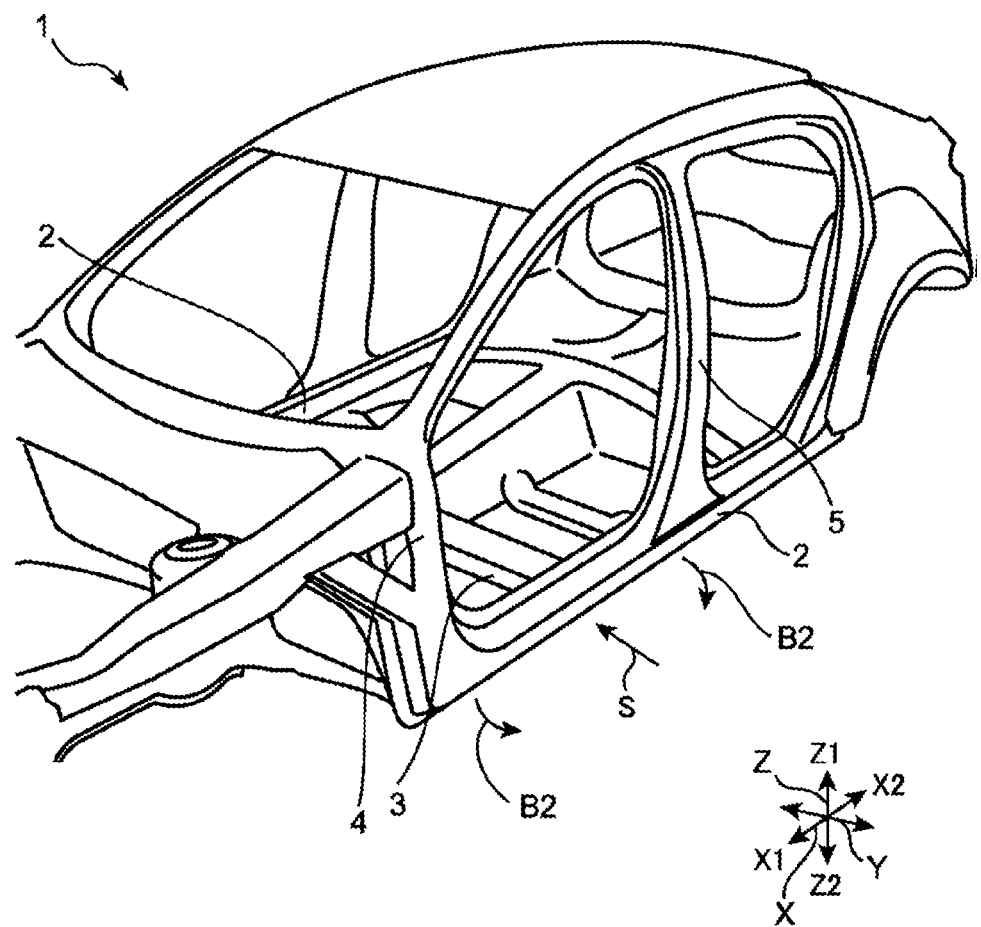
FIG. 12 is a perspective explanatory diagram showing that the bending load is generated at the side sill shown in FIG. 1 in a vehicle side collision.
Figure 13D:
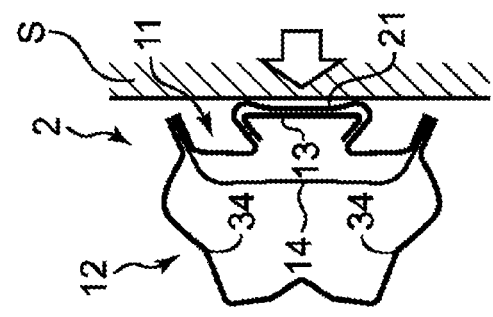
FIGS. 13A-13D are sectional explanatory diagrams showing a deformation process of the side sill in the vehicle side collision.
Figure 13C:
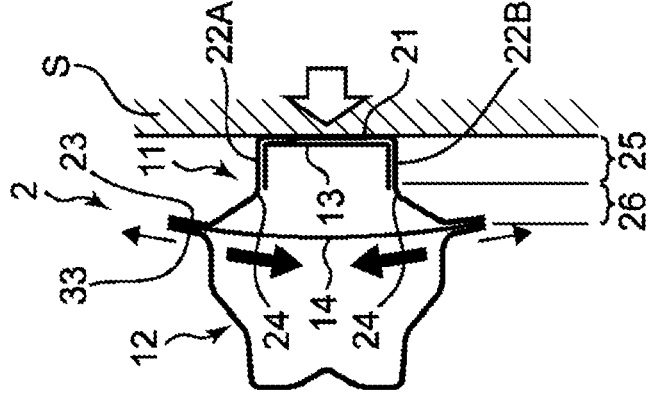
Figure 13B:
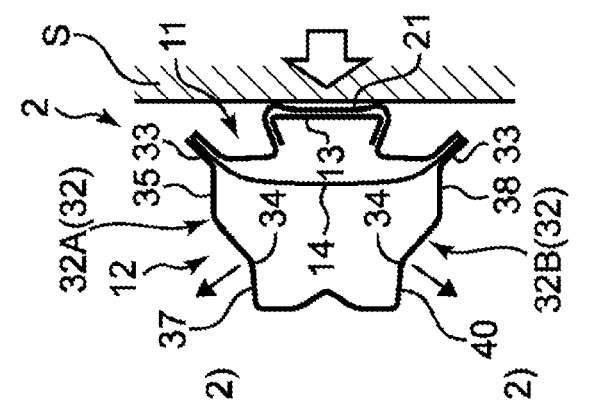
Figure 13A:
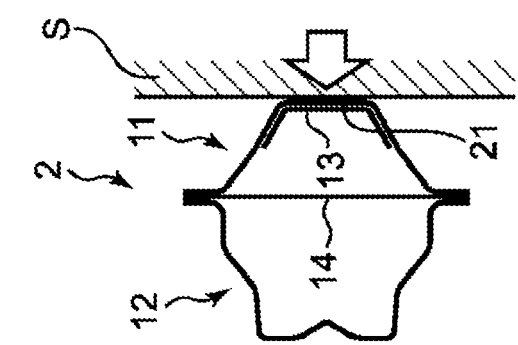

In the vehicle side collision, i.e., when an obstacle S hits against the side sill 2 from the outward side Y1 toward the inward side Y2 in the vehicle width direction Y, a collision load is applied to the side sill 2 from the side as shown in FIG. 13A. Thereby, the bending load B2 to bend the side sill 2 toward vehicle inward side is inputted to the side sill 2 which is fixed at both sides, in the vehicle longitudinal direction X, thereof by vehicle-body structural members, such as the hinge pillar 4 and the center pillar 5 as shown in FIG. 12.

As shown in FIG. 13B, in an initial stage of the vehicle side collision, when the compressive stress acts on the vertical wall portion 21 of the side sill outer 11 of the side sill 2, the vertical wall portion 21 is going to move toward the side sill inner 12 (the inward side Y2), and also the compressive stress acts on the first portion 25 and the tensile stress acts on the second portion 26 at the pair of side face portions 22 of the side sill outer 11. Since the first portion 25 having the patch 13 has the higher rigidity than the second portion 26, moving of the first bending portions 24 toward the inside of the side sill 2 is promoted (induced) even if the first bending portions 24 have the small angle (30 degrees or less).

The second portion 26 is tension-deformed toward the inside of the side sill 2 in accordance with the above-described moving of the first bending portions 24 toward the inside of the side sill 2, so that the buckling is generated at the side sill 2. Herein, in the midway of the process of the moving of the first bending portions 24 toward the inside of the side sill 2, the first portions 25 having the high rigidity become a state where they are roughly parallel to the direction of the collision load (i.e., the moving direction of the vertical wall portion 21 toward the side sill inner 12, specifically, the vehicle width direction Y) in the deformation process. Thereby, a large reaction force against the bending load B2 is generated by the first portion 25. Further, in this compression state, the connecting plate portion 14 suppresses the upper- and lower flanges 23, 33 of the side sill 2 from moving in a direction where these flange portions 23, 33 go away from each other in the vertical direction, so that the large reaction force against the bending load B2 is generated.

Figure 14:
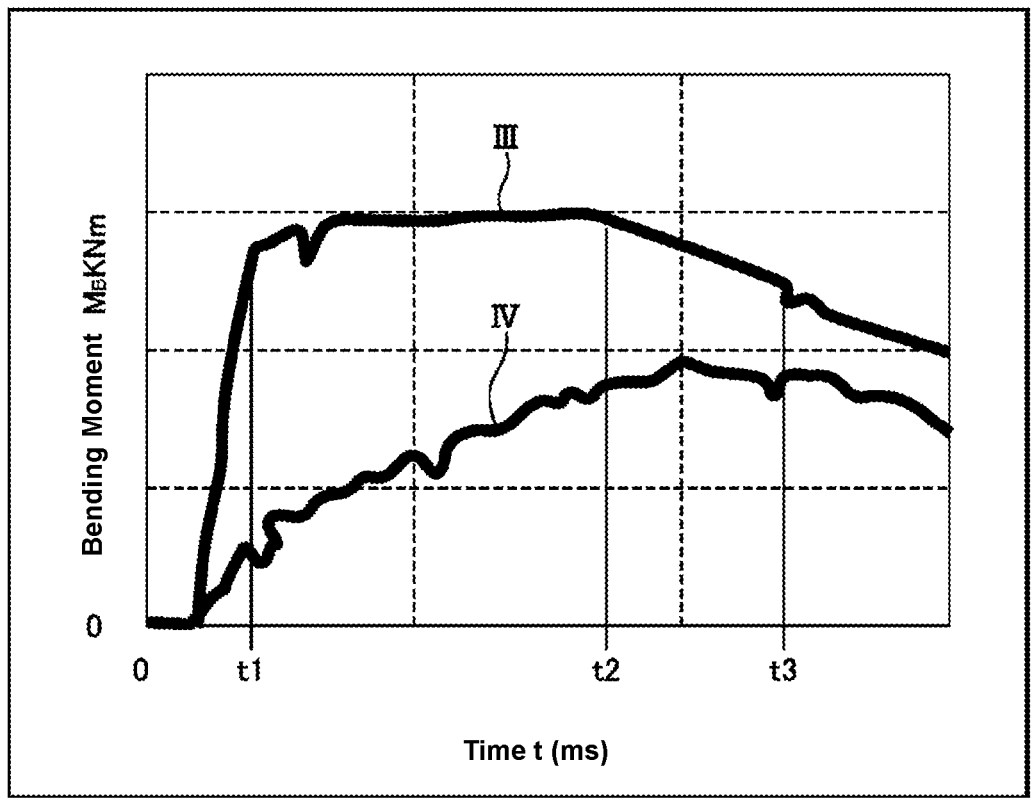
FIG. 14 is a graph showing time changes of respective bending moments of the side sill regarding the present embodiment and the comparative example.

The above-described reaction force is apparent from a graph of FIG. 14 in which a bending moment $M_B$ rises at the time t1 in a curve III. The graph of FIG. 14 shows a time change of the bending moment $M_B$ which is generated at the side sill as the reaction force. The curve III of FIG. 14 shows the time change of the bending moment generated at the side sill 2 of the present embodiment, whereas a curve IV shows a time change of a bending moment generated at a conventional side sill 50 which is shown in FIG. 8 as a comparative example. Herein, the conventional side sill 50 shown in FIG. 8 does not have any bending portion like the first bending portions 24 or the second bending portions 34 of the present embodiment which cause the buckling.

The state shown in FIG. 13B of the present embodiment corresponds to the time t1 in the graph shown in FIG. 14, when the curve III shows that the large bending moment as the reaction force of the side sill 2 is generated. Meanwhile, the curve IV at the time t1 shows that the small bending moment as the reaction force of the conventional side sill 50 is generated.

In a state shown in FIG. 13C where the time has passed further from the start of the vehicle side collision, deformation of the side sill inner 12 also progresses together with the deformation of the side sill outer 11. In the process of the deformation of the side sill inner 12, respective end portions (a pair of flange portions 33 and their surrounding portions) of the outward side Y1 of the pair of side face portions 32 (the upper-side side face portion 32A and the lower-side side face portion 32B) of the side sill inner 12 are extended upwardly Z1 and the downwardly Z2, respectively, so that the side sill inner 12 is going to be deformed such that the first and second upper face portions 35, 37 and the first and second lower face portions 38, 40 protrude toward the outside of the cross section of the side sill 2. At the same time, since the respective second bending portions 34 of the pair of side face portions 32 of the side sill inner 12 are going to be deformed toward the outside of the cross section of the side sill 2, the first and second upper face portions 35, 37 and the first and second lower face portions 38, 40 can keep their roughly-parallel state to the direction of the side-collision load (i.e., the moving direction of the vertical wall portion 21 toward the side sill inner 12, specifically, the vehicle width direction Y). Accordingly, the first and second upper face portions 35, 37 and the first and second lower face portions 38, 40 of the side sill inner 12 can support the side sill outer 11 which is under process of the deformation and generate the larger reaction force, so that the bending deformation of the side sill 2 can be properly suppressed.

The above-described reaction force of the side sill inner 12 is also apparent from the large bending moment at the time t2 in the curve III of the graph of FIG. 14. That is, when the side sill 2 of the present embodiment has the state shown in FIG. 13C, which corresponds to the time t2 in the graph of FIG. 14, the curve III shows a state where the large bending moment as the reaction force of the side sill 2 is maintained. Thus, it is apparent from the curve III that the buckling of the side sill 2 toward the inward side Y2 can be suppressed effectively and the reaction force of the side sill 2 can be maintained because not only the side sill outer 11 has the first bending portions 24 but also the side sill inner 12 has the second bending portions 34.

Meanwhile, the state of the curve IV at the time t2 shows that the bending moment as the reaction force of the conventional side sill 50 does not reach the bending moment of the curve III.

Further, in a state where the time has passed further from the start of the vehicle side collision as shown in FIG. 13D, the side sill inner 12 is more deformed such that the second bending portions 34 move outwardly and the side sill inner 12 protrudes outwardly, so that the reaction force is generated.

The state of the side sill 2 shown in FIG. 13D of the present embodiment corresponds to the time t3 in the graph shown in FIG. 8. It is apparent from FIG. 14 that the bending moment as the reaction force of the side sill 2 at the time t3 in the curve III is going down, but its reaction force is still kept at a sufficiently higher level than the reaction force of the conventional side sill 50 shown in the curve IV.

(Regarding Torsion of Side Sill 2)

In the above-described explanation, the reaction force as the bending moment of the side sill 2 when the bending load B2 is applied to the side sill 2 in the vehicle side collision has been referred to regarding the bending deformation of the side sill 2. However, since the side sill 2 of the present embodiment comprises the first bending portions 24 and the second bending portions 34, the larger reaction force can be generated even in a case where a torsional moment around an axis extending in the vehicle longitudinal direction X is applied.

Figure 15:
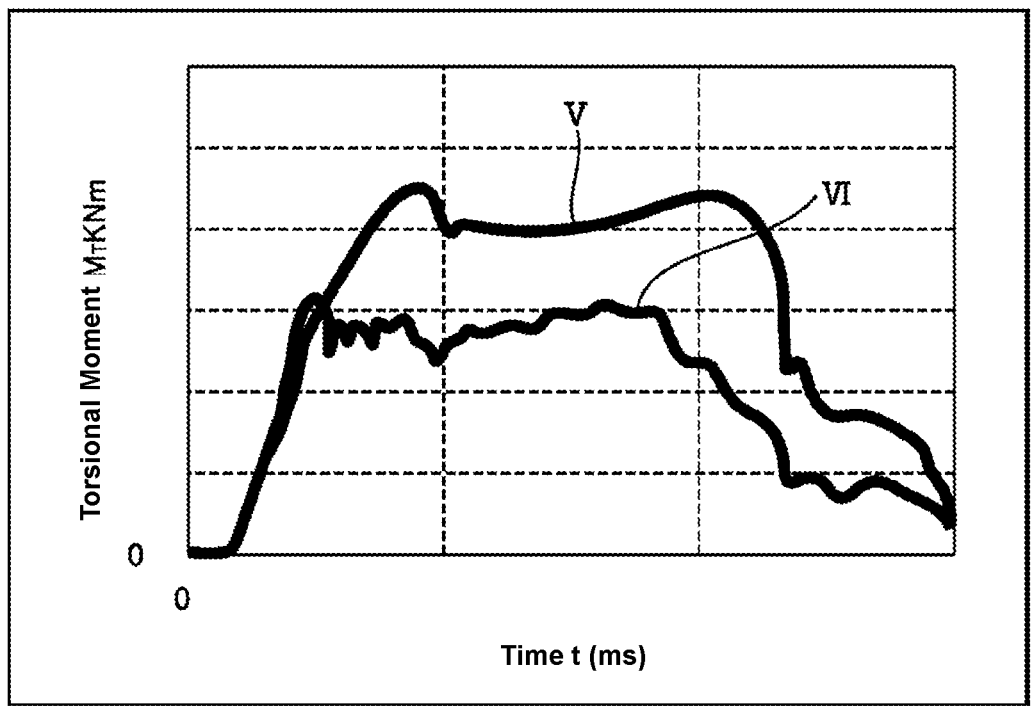
FIG. 15 is a graph showing time changes of respective torsional moments of the side sill regarding the present embodiment and the comparative example.

In a graph of FIG. 15, a time change of a torsional moment $M_T$ as the reaction force of the side sill 2 of the present embodiment is shown by a curve V, whereas a time change of a torsional moment $M_T$ of the conventional side sill 50 of FIG. 7 is shown by a curve VI. As apparent from the graph of FIG. 15, the side sill 2 of the present embodiment (the curve V) and the conventional side sill 50 (the curve VI) generate substantially the equal level of torsional moment as the reaction force in an initial stage when the torsional moment starts to be applied, but after this timing the side sill 2 of the present embodiment keeps the larger torsional moment than the conventional side sill 50 as the reaction force.

Other Features of the Present Embodiment (11)

In the lower vehicle-body structure of the present embodiment, in order to obtain the large reaction force in the vehicle collision even in a case where the width of the cross section of the side sill 2 is reduced for securing the sufficient cabin space, not only the first bending portions 24 is provided at the side sill outer 11 but also the second bending portions 34 and the upper-and-lower four faces extending in the vehicle width direction Y (the first upper face portion 35, the second upper face portion 37, the first lower face portion 38, and the second lower face portion 40) (i.e., lateral walls at four points) are provided at the side sill inner 12.

According to this structure, when the collision load is applied to the side sill 2 from the vehicle side in the vehicle side collision, the respective first bending portions 24 are deformed toward the inside of the side sill 2 at the upper-side side face portion 22A and the lower-side side face portion 22B of the side sill outer 11. The first portion 25 of each of the upper-side side face portion 22A and the lower-side side face portion 22B which is positioned on the outward side, in the vehicle width direction, relative to the first bending portion 24 becomes roughly parallel to a direction of collision load's application in a process of the deformation, so that this portion comes to be crushed in the vehicle width direction Y, generating the large reaction force.

Herein, in the process of the deformation of the side sill inner 12, the respective end portions (the pair of flange portions 33 and their surrounding portions) of the outward side Y1, in the vehicle width direction, of the upper-side side face portion 32A and the lower-side side face portion 32B of the side sill inner 12 are expanded (extended) upwardly Z1 and downwardly Z2, respectively, so that the side sill inner 12 is going to be deformed such that the first upper face portion 35, the second upper face portion 37, the first lower face portion 38, and the second lower face portion 40 of the side sill inner 12 protrude toward the outside of the cross section of the side sill 12. However, since the respective second bending portions 34 of the upper-side side face portion 32A and the lower-side side face portion 32B of the side sill inner 12 are going to move toward the outside of the cross section at the same time, the first upper face portion 35, the second upper face portion 37, the first lower face portion 38, and the second lower face portion 40 can keep a state where they are roughly parallel to the direction of collision load's application (i.e., the moving direction of the vertical wall portion 21 toward the side sill inner 12, specifically, the vehicle width direction Y). Accordingly, the first upper face portion 35, the second upper face portion 37, the first lower face portion 38, and the second lower face portion 40 of the side sill inner 12 support the side sill outer 11 which is under process of the deformation, thereby generating the larger reaction force, so that the bending deformation of the side sill can be suppressed.

Thereby, the side sill 2 can generate the large reaction force against the collision load applied from the vehicle side by means of both of the side sill outer 11 and the side sill inner 12, thereby properly increasing the bending resistance of the side sill 2 without increasing its weight and manufacturing costs.

In other words, the first-and-second upper face portions 35, 37 and the first-and-second lower face portion 38, 40 of the side sill inner 12 of the present embodiment can support the side sill outer 11 under process of the deformation and thereby generate the large reaction force. Herein, in a case where only the second bending portions 34 are provided at the upper-side side face portion 32A (upper face portion) and the lower-side side face portion 32B of the side sill inner 12, i.e., the upper-side side face portion 32A and the lower-side side face portion 32B are configured to have a bent-shaped cross section merely, an area (portion) of each of the upper-side side face portion 32A and the lower-side side face portion 32B which comes to be parallel to the direction of collision load's application in the process where the second bending portions 34 move toward the outside of the side sill 2 is so limited (small) that the sufficiently large reaction force cannot be obtained.

(12)

In the lower vehicle-body structure of the present embodiment, the width L2, in the specified direction where the side sill outer 11 and the side sill inner 12 are arranged in a row (vehicle width direction Y), of the first portion 25 which is positioned on the outward side Y1 relative to the first bending portion 24 is set at ¼ or less relative to the whole width L1, in the above-described specified direction, of the side sill 2.

According to this structure, when the vehicle has the collision, the buckling of the side sill 2 at the first portions 25 of the upper-side side face portion 22A and the lower-side side face portion 22B of the side sill outer 11 is suppressed and also the secure bending of the upper-side side face portion 22A and the lower-side side face portion 22B at the first bending portions 24 as the border between the first portion 25 and the second portion 26 becomes possible, so that the large reaction force can be generated at the upper-side side face portion 22A and the lower-side side face portion 22B.

Figure 16:
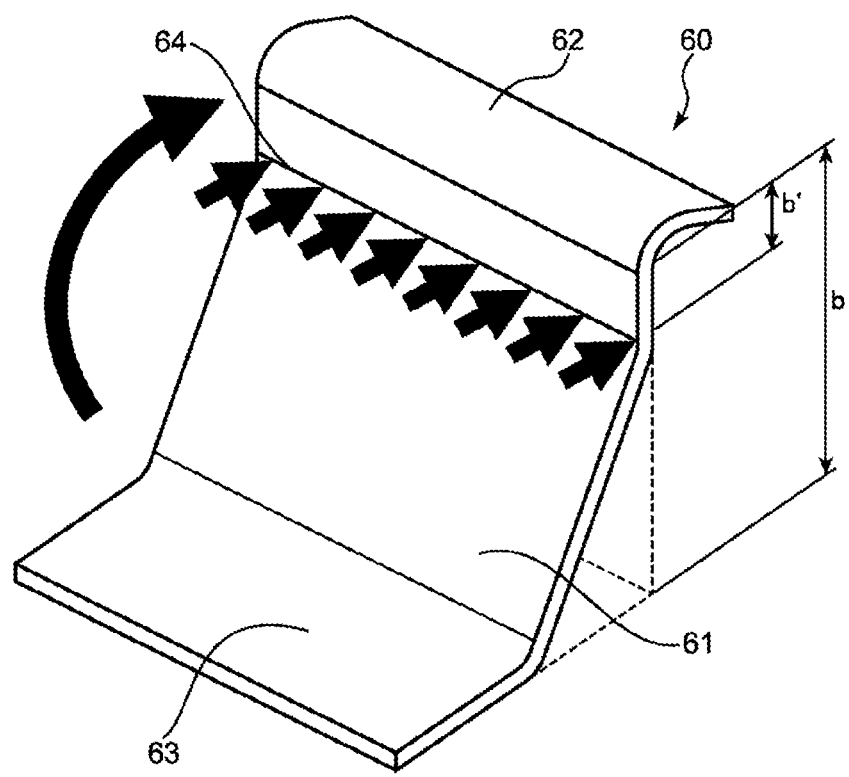
FIG. 16 is a diagram showing a vertical plate for testing regarding a position of a bending portion.
Figure 17:
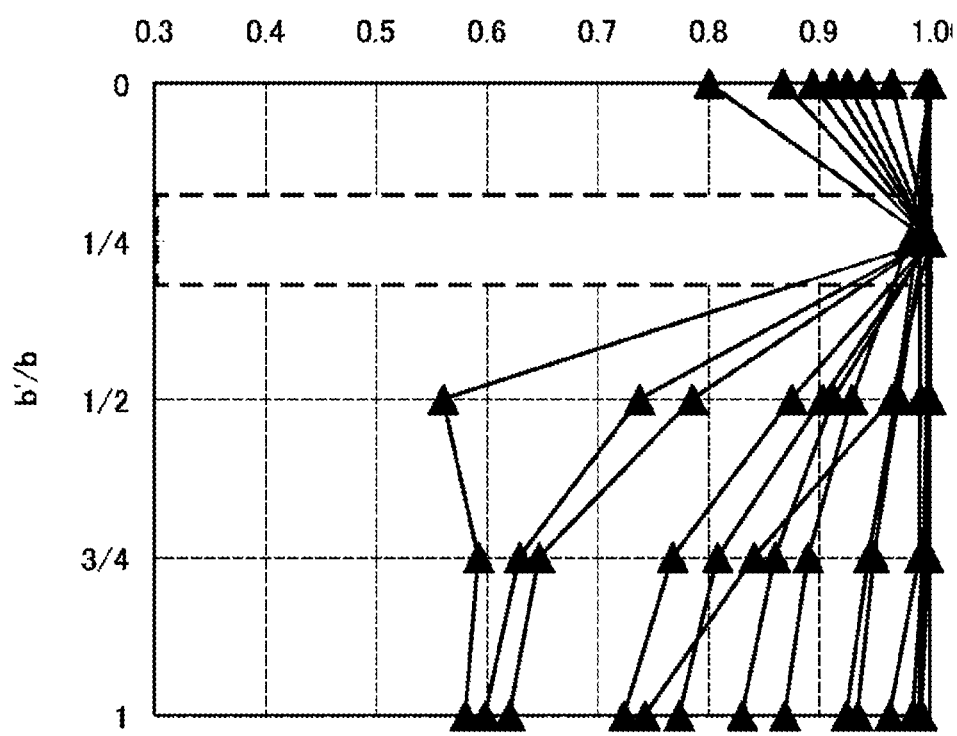
FIG. 17 is a graph showing changes of buckling-resistance ratios in a case where a ratio of a distance between an upper end of the vertical plate and the bending portion relative to a whole height of the vertical plate is changed.

Herein, the best position, in the whole width of the side sill, of the bending portion to promote the buckling will be studied referring to FIGS. 16 and 17. First, as shown in FIG. 16, a portion of the whole width, in the vehicle width direction, of the side sill is considered as a model of a single vertical plate 61. Upper-and-lower end portions of the vertical wall 61 are connected to end plates 62, 63 and thereby restrained.

It can be considered that the bending portion 64 as a shape changing point (i.e., a buckling point of the vertical plate 61) is provided at the vertical plate 61 for approaching an all plastic moment as an all potential which the vertical plate 61 has originally, i.e., an index of the ideal buckling resistance of the vertical plate 61. Herein, by using the model where the vertical plate 61 has buckling at the bending portion 64 and is bent when a vertical-directional bending load is applied to the vertical plate 61 as shown in FIG. 16, a buckling-resistance ratio R, which may become a criteria of the magnitude of a reaction force of the vertical plate 61 in which the bending portion 64 is provided at a position which is distance b' away from the upper end of the vertical plate 61 having a whole height b, has been obtained by computer simulation. As a result, as shown by a graph of FIG. 17 which shows a relationship between a ratio b/b' of the distance b' to the whole height b of the vertical plate 61 and the buckling-resistance ratio R (a ratio to the ideal buckling resistance), it has been found that the buckling resistance shows its largest magnitude in a case where the bending portion 64 is provided at a position located at ¼ of the whole height b of the vertical plate 61.

It can be considered from the above-described results that the buckling resistance increases the most when the first bending portion 24 of the side sill 2 is ¼×L1 away from the vertical wall portion 21 (L1=the whole width of the side sill 2). Based on the above-described studies, the following results can be obtained. That is, by setting the width L2 of the first portion 25 at ¼ or less relative to the whole width L1, in the specified direction (vehicle width direction Y), of the side sill 2, the buckling of the side sill 2 in the first portion 25 can be properly suppressed and also the bending of the side face portions 22 at the first bending portions 24 as the border between the first portion 25 and the second portion 26 can be bent, so that the large reaction force can be generated at the upper-side side face portion 22A and the lower-side side face portions 22B.

(13)

In the lower vehicle-body structure of the present embodiment, the width L3, in the specified direction where the side sill outer 11 and the side sill inner 12 are arranged in a row (vehicle width direction Y), of each of the second upper face portion 37 and the second lower face portion 40 is set at ¼ or less relative to the whole width L1, in the specified direction (vehicle width direction Y), of the side sill 2. Thereby, the side sill 2 can have the buckling securely at the second bending portions 34, suppressing buckling at the second upper face portion 37 and the second lower face portion 40, when the bending load is applied in the vehicle side collision or the like.

Herein, this setting of the width L3 can be also induced from the same logical explanation regarding the above-described stetting of the width L2 which uses the above-described FIGS. 16 and 17.

Further, when the vehicle has the small overlap collision, the front end portion 2b of the side sill 2 is deformed in a cantilever shape, so that the side sill inner 12 is compression-deformed. Herein, by setting the width L3 of the second upper face portion 37 and the second lower face portion 40 as described above, the large reaction force can be obtained at the side sill inner 12 as well, so that the large deformation of the cross section of the side sill 2 can be prevented.

(14)

In the lower vehicle-body structure of the present embodiment, each of the pair of side face portions 22 (the upper-side side face portion 22A and the lower-side side face portion 22B) of the side sill outer 11 comprises the first portion 25 which is positioned on the outward side Y1, in the vehicle width direction Y, relative to the first bending portion 24 and the second portion 26 which is positioned on the inward side Y2, in the vehicle width direction Y, relative to the first bending portion 24. The first portion 25 is configured to have the higher rigidity than the second portion 26. Accordingly, even in a case where the angle θ of the first bending portion 24 between the extension line of the first portion 25 and the second portion 26 is set at 30 degrees or less, since the second portion 26 of each of the upper-side side face portion 22A and the lower-side side face portion 22B of the side sill outer 11 is configured to have the lower rigidity than the first portion 25, the second portions 26 are tension-deformed toward the inside of the side sill 2 and also the first bending portions 24 move toward the inside of the side sill 2 in the vehicle side collision, so that the buckling of the side sill 2 can be securely generated.

That is, according to the side sill 2 of the present embodiment, even in a case where the angle θ of the first bending portion 24 of the side sill outer 11 cannot be secured sufficiently in the structure in which the sufficient width of each of the upper-and-lower side face portions 22 (the upper-side side face portion 22A and the lower-side side face portion 22B) of the side sill outer 11 is not secured, the first bending portions 24 of the side face portions 22 can be deformed toward the inside of the cross section of the side sill 2 and thereby the side sill 2 can have the buckling securely.

(15)

Further, in the structure of the side sill outer 11, each of the side face portions 22 (the upper-side side face portion 22A and the lower-side side face portion 22B) comprises the first portion 25 which is positioned on the side of the vertical wall portion 21 relative to the first bending portion 24 and the second portion 26 which is positioned on the side away from the vertical wall portion 21 relative to the first bending portion 24, and the first portion 25 is configured to have the higher rigidity than the second portion 26 against the bending load B2 operative to compress the vertical wall portion 21. In other words, the rigidity of the side face portion 22 is configured to change discontinuously at the first bending portion 24 as the border from the rigidity of the first portion 25 to the rigidity of the second portion 26. Accordingly, when the vehicle has the side collision, as shown in FIG. 13B, the second portion 26 is tension-deformed toward the inside of the side sill 2 in accordance with the first bending portions 24 moving toward the inside of the side sill 2 and also the first bending portions 24 move toward the inside of the side sill 2, so that the buckling of the side sill 2 can be generated. Herein, in the midway of the process of the moving of the first bending portions 24 toward the inside of the side sill 2, the first portion 25 becomes the state where it is roughly parallel to the moving direction toward the side sill inner 12 in the deformation process of the first portion 25 having the high rigidity of each of the pair side face portions 22. Accordingly, since the large reaction force is generated against the bending load B by the first portion 25, the bending deformation of the side sill 2 can be suppressed. Consequently, the side sill 2 can attain the proper impact absorption by securely generating the buckling, suppressing its bending deformation, when the bending load B2 is applied to the side frame 2 in the vehicle side collision.

(16)

In the lower vehicle-body structure of the present embodiment, as shown in FIG. 5, the respective flange portions 23, 33 of the side sill outer 11 and the side sill inner 12 which form the side sill 2 are arranged on the outward side Y1, in the vehicle width direction Y, relative to the sectional center O of the side sill 2. According to this structure, the position of the door opening portion 8 of the vehicle body 1 which is partitioned by these flange portions 23, 33 can be easily located outwardly Y1 in the vehicle width direction Y, so that the cabin space can be secured properly. Accordingly, this structure can secure the sufficient cabin space properly, attaining suppressing of the bending deformation of the side sill 2 and maintaining of the impact absorption performance.

(17)

In the lower vehicle-body structure of the present embodiment, the side sill 2 comprises the connecting plate portion 14. The connecting plate portion 14 interconnects the pair of upper-and-lower flange portions 23, 33 of the side sill outer 11 and the side sill inner 12 in the state where the connecting plate portion 14 is interposed between the respective pair of upper-and-lower flange portions 23, 33 of the side sill outer 11 and the side sill inner 12. According to this structure, even if the pair of upper-and-lower flange portions 23, 33 are going to move in the direction where these flange portions 23, 33 go away from each other in the vertical direction Z in the process of the bending deformation of the side sill 2 in the vehicle side collision, that vertical moving of the flange portions 23, 33 in the vertical direction Z is suppressed (i.e., the pair of flange portions 23 (and the pair of flange portions 33) are suppressed from going away from each other in the vertical direction Z) by the connecting plate portion 14. Therefore, the secure buckling of the side sill 2 at the first and second bending portions 24, 34 can be attained.

(18)

In the lower vehicle-body structure of the present embodiment, the connecting plate portion 14 is arranged at the part 2a (see FIG. 1) of the side sill 2, in the vehicle longitudinal direction X, which forms the door opening portion 8 of the vehicle body 1. While the door opening portion 8 of the vehicle body 1 is an area with no pillar extending in the vertical direction Z where the support rigidity of the side sill 2 is low, since the connecting plate portion 14 is arranged at the part 2a of the side sill 2 which forms the door opening portion 8 of the vehicle body 1 as described above, the buckling of the side sill 2 at the first and second bending portions 24, 34 can be attained securely even in the area with no pillar.

(19)

In the lower vehicle-body structure of the present embodiment, the first portion 25 of the side sill outer 11 is formed by two sheets of plate members, i.e., the main plate member 20 and the patch 13 which are joined together. According to this structure, since the first portion 25 of the side face portion 22 of the side sill outer 11 is formed by the two sheets of plate members, the side sill 2 capable of having the buckling can be easily manufactured by the two sheets of plate members joined together at the side sill outer 11.

(20)

In the lower vehicle-body structure of the present embodiment, the first bending portions 24 of the pair of side face portions 22 of the side sill outer 11 are equidistance from the vertical wall portion 21. According to this structure, when the bending load B2 is applied to the side sill 2 in the vehicle collision, the first bending portions 24 of the pair of side face portions 22 can be moved inwardly at the same time, so that the side sill 2 can securely have the buckling at the respective first bending portions 24 of the pair of side face portions 22.

Modified Examples (A)

While the side sill outer 11 of the above-described embodiment is formed by the two sheets of plate members, such as steel plates, of the main plate member 20 and the patch 13 which are joined together and manufactured by pressing, the present invention is not limited to this, and the patch 13 is unnecessary. However, if the patch 13 is provided, the side sill outer 11 can have the buckling at the first bending portions 24 more securely.

(B)

While the first portion 25 of the side sill outer 11 of the above-described embodiment is formed by the two sheets of plate members, i.e., the main plate member 20 and the patch 13 which are joined together, the present invention is not limited to this. In a case where the side sill outer 11 is formed by a shingle sheet of plate member, the plate thickness of the first portion 25 may be set to be larger than that of the second portion 26. In this structure, the side sill 2 capable of having the buckling can be easily manufactured by integrally forming the side sill outer 11 itself.

(C)

While the closed-cross section C of the side sill 2 of the above-described embodiment is formed by joining the side sill outer 11 as the first portion and the side sill inner 12 as the second portion which are different members from each other, the present invention is not limited to this. The side sill may be configured such that the side sill outer and the side sill inner which correspond to the first portion and the second portion, respectively, are integrally formed. In this case, the same functions and effects as those of the side sill 2 of the above-described embodiment can be obtained as well.

What is claimed is:

1. A lower vehicle-body structure of a vehicle, comprising:
    a side sill having a closed-cross section jointly formed by a side sill outer and a side sill inner which extend in a vehicle longitudinal direction; and
    a cross member joined to the side sill inner of the side sill at a position located on a rearward side, in the vehicle longitudinal direction, relative to a front end portion of the side sill and extending toward an inward side, in a vehicle width direction, from the side sill,
    wherein said side sill inner comprises an upper face portion and a lower face portion which is downwardly away from said upper face portion, each of which comprises a bending portion, a slant face portion, and a vehicle-width-direction face portion which are respectively located at least in an area, in the vehicle longitudinal direction, between the front end portion of said side sill and said cross member, the bending portion being formed by each of the upper face portion and the lower face portion bent toward an inside of the side sill, the slant face portions being configured to extend from said bending portions toward said side sill outer in an oblique direction such that a width, in a vertical direction, of the side sill inner gradually increases, the vehicle-width-direction face portion being configured to extend in the vehicle width direction toward the inward side, in the vehicle width direction, from said bending portion.

2. The lower vehicle-body structure of the vehicle of claim 1, wherein an upper face of said cross member is located above said vehicle-width-direction face portion of said upper face portion of said side sill inner.

3. The lower vehicle-body structure of the vehicle of claim 2, wherein said cross member comprises a first flange portion which is joined to said vehicle-width-direction face portion of said upper face portion of said side sill inner.

4. The lower vehicle-body structure of the vehicle of claim 2, wherein said side sill inner comprises a vertical wall portion which extends in the vertical direction at an end portion of an inward side, in the vehicle width direction, of the side sill inner and interconnects said upper face portion and said lower face portion, and said cross member comprises a second flange portion which is joined to said vertical wall portion of the side sill inner.

5. The lower vehicle-body structure of the vehicle of claim 2, wherein said side sill inner comprises a vertical wall portion which extends in a vertical direction at an end portion of the inward side, in the vehicle width direction, of the side sill inner and interconnects said vehicle-width-direction face portion of said upper face portion of said side sill inner and said vehicle-width-direction face portion of said lower face portion of said side sill inner, and said vertical wall portion has a bead which extends in the vehicle longitudinal direction.

6. The lower vehicle-body structure of the vehicle of claim 5, wherein said bead extends from the front end portion of said side sill at least up to a rear end portion of said cross member.

7. The lower vehicle-body structure of the vehicle of claim 2, wherein said side sill inner further comprises a pair of upper-and-lower flange portions which are provided at respective end portions, on a side of said side sill outer, of said upper face portion and said lower face portion, and said side sill further comprises a connecting plate portion which interconnects said pair of upper-and-lower flange portions of the side sill inner.

8. The lower vehicle-body structure of the vehicle of claim 7, wherein said connecting plate portion is arranged at a part of said side sill, in the vehicle longitudinal direction, which forms a door opening portion of a vehicle body.

9. The lower vehicle-body structure of the vehicle of claim 8, wherein said connecting plate portion is configured to have smaller bending strength than said side sill outer and said side sill inner.

10. The lower vehicle-body structure of the vehicle of claim 1, wherein said cross member comprises a first flange portion which is joined to said vehicle-width-direction face portion of said upper face portion of said side sill inner.

11. The lower vehicle-body structure of the vehicle of claim 1, wherein said side sill inner comprises a vertical wall portion which extends in the vertical direction at an end portion of an inward side, in the vehicle width direction, of the side sill inner and interconnects said upper face portion and said lower face portion, and said cross member comprises a second flange portion which is joined to said vertical wall portion of the side sill inner.

12. The lower vehicle-body structure of the vehicle of claim 1, wherein said side sill inner comprises a vertical wall portion which extends in a vertical direction at an end portion of the inward side, in the vehicle width direction, of the side sill inner and interconnects said vehicle-width-direction face portion of said upper face portion of said side sill inner and said vehicle-width-direction face portion of said lower face portion of said side sill inner, and said vertical wall portion has a bead which extends in the vehicle longitudinal direction.

13. The lower vehicle-body structure of the vehicle of claim 1, wherein said side sill inner further comprises a pair of upper-and-lower flange portions which are provided at respective end portions, on a side of said side sill outer, of said upper face portion and said lower face portion, and said side sill further comprises a connecting plate portion which interconnects said pair of upper-and-lower flange portions of the side sill inner.

14. The lower vehicle-body structure of the vehicle of claim 12, wherein said bead extends from the front end portion of said side sill at least up to a rear end portion of said cross member.

15. The lower vehicle-body structure of the vehicle of claim 13, wherein said connecting plate portion is arranged at a part of said side sill, in the vehicle longitudinal direction, which forms a door opening portion of a vehicle body.

\* \* \* \* \*